(12) United States Patent
Cronin et al.

(10) Patent No.: US 10,264,175 B2
(45) Date of Patent: Apr. 16, 2019

(54) FACIAL RECOGNITION FOR EVENT VENUE CAMERAS

(71) Applicant: ProSports Technologies, LLC, Miami, FL (US)

(72) Inventors: John E. Cronin, Bonita Springs, FL (US); Seth M. Cronin, Clarksville, TN (US); Gene Fein, Camarillo, CA (US); Nick Reasner, Miami, FL (US)

(73) Assignee: ProSports Technologies, LLC, Miami, FL (US)

( * ) Notice: Subject to any disclaimer, the term of this patent is extended or adjusted under 35 U.S.C. 154(b) by 0 days.

(21) Appl. No.: 14/829,598

(22) Filed: Aug. 18, 2015

(65) Prior Publication Data

US 2016/0073010 A1 Mar. 10, 2016

Related U.S. Application Data

(60) Provisional application No. 62/047,937, filed on Sep. 9, 2014, provisional application No. 62/048,938, filed on Sep. 11, 2014.

(51) Int. Cl.
*H04N 5/232* (2006.01)
*H04N 1/00* (2006.01)
(Continued)

(52) U.S. Cl.
CPC ......... *H04N 5/23219* (2013.01); *G06Q 10/00* (2013.01); *H04N 1/00* (2013.01);
(Continued)

(58) Field of Classification Search
CPC ....................................... G07C 1/00
See application file for complete search history.

(56) References Cited

U.S. PATENT DOCUMENTS

| 3,586,326 A | 6/1971 | McKenna |
| 3,825,261 A | 7/1974 | Zapos |

(Continued)

FOREIGN PATENT DOCUMENTS

| AU | 2014100006 | 2/2014 |
| CN | 102527007 | 7/2012 |

(Continued)

OTHER PUBLICATIONS

US 9,895,591 B2, 02/2018, Cronin (withdrawn)
(Continued)

*Primary Examiner* — Bruce I Ebersman
(74) *Attorney, Agent, or Firm* — Polsinelli LLP

(57) ABSTRACT

An event venue with a performance area (e.g., a sport field or auditorium stage) and an eventgoer area (e.g., stadium seating or bleachers) may include a set of eventgoer cameras trained on various sections of the eventgoer area and a set of performance cameras trained on the performance area. The event venue may also include sensors. When an event occurrence (e.g., a goal or touchdown) is detected using the cameras and/or sensors, at least one photo or video of the event occurrence may be captured by the performance cameras, and at least one photo or video of the eventgoer reaction may be captured using the eventgoer cameras. Facial recognition may then be used to identify particular eventgoers in each photo or video. Identified eventgoers can then receive photos or videos in which they are identified along with performance photos or videos that were captured at roughly the same time.

20 Claims, 10 Drawing Sheets

US 10,264,175 B2
Page 2

(51) Int. Cl.
*G06Q 10/00* (2012.01)
*H04N 5/247* (2006.01)
*G07B 15/00* (2011.01)

(52) U.S. Cl.
CPC ..... *H04N 1/00137* (2013.01); *H04N 1/00145* (2013.01); *H04N 1/00222* (2013.01); *G07B 15/00* (2013.01); *H04N 5/247* (2013.01)

(56) References Cited

U.S. PATENT DOCUMENTS

| | | | |
|---|---|---|---|
| 3,856,302 A | 12/1974 | Karkoska | |
| 4,014,117 A | 3/1977 | Vallillee | |
| 4,763,284 A | 8/1988 | Carlin | |
| 4,771,394 A | 9/1988 | Cavanagh | |
| 5,293,354 A | 3/1994 | Costabile | |
| 5,462,275 A | 10/1995 | Lowe et al. | |
| 6,013,007 A | 1/2000 | Root et al. | |
| 6,070,879 A | 6/2000 | Kemp | |
| 6,181,236 B1 | 1/2001 | Schneider | |
| 6,389,368 B1 | 5/2002 | Hampton | |
| 6,603,711 B2 | 8/2003 | Calace | |
| 6,629,104 B1 | 9/2003 | Parulski et al. | |
| 6,760,276 B1 | 7/2004 | Karr | |
| 6,836,744 B1 | 12/2004 | Asphahani et al. | |
| 6,907,840 B1 | 6/2005 | Gaines | |
| 7,020,336 B2 | 3/2006 | Cohen-Solal et al. | |
| 7,031,225 B2 | 4/2006 | McDonald | |
| 7,115,053 B2 | 10/2006 | Meichner | |
| 7,173,533 B1 | 2/2007 | Beron et al. | |
| 7,174,277 B2 | 2/2007 | Vock et al. | |
| 7,561,494 B2 | 7/2009 | Stern | |
| 7,561,723 B2* | 7/2009 | Goldberg | G03D 15/001 |
| | | | 382/115 |
| 7,602,301 B1 | 10/2009 | Stirling et al. | |
| 7,618,312 B1 | 11/2009 | Kasten | |
| 7,634,662 B2 | 12/2009 | Monroe | |
| 7,693,668 B2 | 4/2010 | Vock et al. | |
| 7,715,723 B2 | 5/2010 | Kagawa et al. | |
| 7,720,572 B2* | 5/2010 | Ziegler | B25J 5/007 |
| | | | 340/3.5 |
| 7,805,149 B2 | 9/2010 | Werner et al. | |
| 7,920,052 B2 | 4/2011 | Costabile | |
| 7,924,323 B2* | 4/2011 | Walker | G11B 27/034 |
| | | | 348/231.2 |
| 8,054,174 B1 | 11/2011 | Uehran | |
| 8,098,881 B2 | 1/2012 | Camp et al. | |
| 8,239,146 B2 | 8/2012 | Vock et al. | |
| 8,253,586 B1 | 8/2012 | Matak | |
| 8,257,084 B1 | 9/2012 | Kreiner et al. | |
| 8,257,228 B2 | 9/2012 | Quartrochi et al. | |
| 8,289,185 B2 | 10/2012 | Alonso | |
| 8,326,136 B1 | 12/2012 | Clark | |
| 8,396,687 B2 | 3/2013 | Vock et al. | |
| 8,477,046 B2 | 7/2013 | Alonso | |
| 8,485,879 B2 | 7/2013 | Lin et al. | |
| 8,554,495 B2 | 10/2013 | Mack et al. | |
| 8,554,509 B2 | 10/2013 | Crisco et al. | |
| 8,579,632 B2 | 11/2013 | Crowley | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,684,819 B2 | 4/2014 | Thomas et al. | |
| 8,702,504 B1 | 4/2014 | Hughes et al. | |
| 8,706,044 B2 | 4/2014 | Chang et al. | |
| 8,724,723 B2 | 5/2014 | Panicker et al. | |
| 8,724,909 B2* | 5/2014 | Quack | G06F 17/30256 |
| | | | 382/100 |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 8,994,498 B2* | 3/2015 | Agrafioti | G06F 21/40 |
| | | | 340/5.52 |
| 9,185,361 B2* | 11/2015 | Curry | H04N 5/222 |
| 9,305,441 B1 | 4/2016 | Cronin | |
| 9,398,213 B1 | 7/2016 | Cronin | |
| 9,474,933 B1 | 10/2016 | Cronin | |
| 9,502,018 B2 | 11/2016 | Cronin | |
| 9,610,491 B2 | 4/2017 | Cronin | |
| 9,652,949 B1 | 5/2017 | Cronin | |
| 9,724,588 B1 | 8/2017 | Cronin | |
| 9,792,285 B2* | 10/2017 | Reiley | G06F 17/30035 |
| 9,795,858 B1 | 10/2017 | Cronin | |
| 9,919,197 B2* | 3/2018 | Cronin | G06F 17/30781 |
| 2001/0003715 A1 | 6/2001 | Jutzi et al. | |
| 2001/0048484 A1 | 12/2001 | Tamir et al. | |
| 2003/0163287 A1 | 8/2003 | Vock et al. | |
| 2003/0210612 A1 | 11/2003 | Stern | |
| 2004/0043843 A1 | 3/2004 | Ryan | |
| 2005/0046584 A1 | 3/2005 | Breed | |
| 2005/0117022 A1 | 6/2005 | Marchant | |
| 2005/0162257 A1 | 7/2005 | Gonzalez | |
| 2005/0242508 A1 | 11/2005 | Meichner | |
| 2005/0277466 A1 | 12/2005 | Lock | |
| 2006/0052147 A1 | 3/2006 | Matthews | |
| 2006/0074338 A1 | 4/2006 | Greenwald et al. | |
| 2006/0109089 A1 | 5/2006 | Boehm et al. | |
| 2006/0180073 A1 | 8/2006 | Nakamoto | |
| 2006/0208169 A1 | 9/2006 | Breed et al. | |
| 2006/0281061 A1 | 12/2006 | Hightower et al. | |
| 2007/0003113 A1 | 1/2007 | Goldberg | |
| 2007/0135264 A1 | 6/2007 | Rosenberg | |
| 2007/0269203 A1 | 11/2007 | Awazu | |
| 2007/0279494 A1 | 12/2007 | Aman et al. | |
| 2008/0082311 A1 | 4/2008 | Meijer et al. | |
| 2008/0129825 A1 | 6/2008 | DeAngelis et al. | |
| 2008/0146302 A1 | 6/2008 | Olsen et al. | |
| 2008/0312010 A1* | 12/2008 | Marty | A63B 24/0003 |
| | | | 473/447 |
| 2009/0023122 A1 | 1/2009 | Lieberman et al. | |
| 2009/0029754 A1 | 1/2009 | Slocum et al. | |
| 2009/0111582 A1 | 4/2009 | Schuler et al. | |
| 2009/0256912 A1 | 10/2009 | Rosenberg | |
| 2010/0026809 A1 | 2/2010 | Curry | |
| 2010/0030350 A1 | 2/2010 | House et al. | |
| 2010/0102938 A1 | 4/2010 | Delia et al. | |
| 2010/0105503 A1 | 4/2010 | Daisher et al. | |
| 2010/0144414 A1 | 6/2010 | Edis et al. | |
| 2010/0185398 A1 | 7/2010 | Berns et al. | |
| 2010/0283630 A1 | 11/2010 | Alonso | |
| 2011/0013087 A1 | 1/2011 | House et al. | |
| 2011/0064281 A1 | 3/2011 | Chan | |
| 2011/0169959 A1 | 7/2011 | DeAngelis et al. | |
| 2011/0181418 A1 | 7/2011 | Mack et al. | |
| 2011/0184320 A1 | 7/2011 | Shipps et al. | |
| 2011/0248992 A1 | 10/2011 | van Os | |
| 2011/0251802 A1 | 10/2011 | Song | |
| 2012/0002509 A1 | 1/2012 | Saguin et al. | |
| 2012/0029666 A1 | 2/2012 | Crowley et al. | |
| 2012/0052947 A1 | 3/2012 | Yun | |
| 2012/0063272 A1 | 3/2012 | Dorais et al. | |
| 2012/0081531 A1 | 4/2012 | DeAngelis et al. | |
| 2012/0099405 A1 | 4/2012 | Lidor et al. | |
| 2012/0100911 A1 | 4/2012 | Rejen | |
| 2012/0116259 A1 | 5/2012 | McConnell et al. | |
| 2012/0116548 A1 | 5/2012 | Goree et al. | |
| 2012/0120201 A1* | 5/2012 | Ward | G06T 19/006 |
| | | | 348/47 |
| 2012/0124720 A1 | 5/2012 | Evans et al. | |
| 2012/0166449 A1 | 6/2012 | Pitaliya | |
| 2012/0197998 A1 | 8/2012 | Kessel et al. | |

(56) References Cited

U.S. PATENT DOCUMENTS

| | | |
|---|---|---|
| 2012/0202594 A1 | 8/2012 | Bistis et al. |
| 2012/0212505 A1 | 8/2012 | Burroughs et al. |
| 2012/0223833 A1 | 9/2012 | Thomas et al. |
| 2012/0324491 A1 | 12/2012 | Bathiche et al. |
| 2013/0018494 A1 | 1/2013 | Amini |
| 2013/0045806 A1 | 2/2013 | Bloodworth |
| 2013/0060138 A1 | 3/2013 | Chu et al. |
| 2013/0066448 A1 | 3/2013 | Alonso |
| 2013/0080222 A1 | 3/2013 | Quinn |
| 2013/0091209 A1* | 4/2013 | Bennett ............ G06Q 50/01 709/204 |
| 2013/0095924 A1 | 4/2013 | Geisner et al. |
| 2013/0126713 A1 | 5/2013 | Haas et al. |
| 2013/0138590 A1 | 5/2013 | Huke et al. |
| 2013/0139068 A1 | 5/2013 | Bowring |
| 2013/0141555 A1 | 6/2013 | Ganick et al. |
| 2013/0166048 A1 | 6/2013 | Werner et al. |
| 2013/0222133 A1* | 8/2013 | Schultz ............ G08G 1/205 340/539.13 |
| 2013/0235702 A1 | 9/2013 | Saguin et al. |
| 2013/0249708 A1 | 9/2013 | Moll-Carrillo et al. |
| 2013/0279917 A1 | 10/2013 | Son et al. |
| 2013/0303192 A1 | 11/2013 | Louboutin |
| 2013/0314407 A1 | 11/2013 | Meehan |
| 2013/0316837 A1 | 11/2013 | Coiner, Jr. |
| 2013/0317835 A1 | 11/2013 | Mathew |
| 2013/0322689 A1 | 12/2013 | Carmichael |
| 2013/0324239 A1 | 12/2013 | Ur et al. |
| 2013/0328917 A1 | 12/2013 | Zhou |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335635 A1 | 12/2013 | Ghanem et al. |
| 2013/0336662 A1 | 12/2013 | Murayama et al. |
| 2013/0343762 A1 | 12/2013 | Murayama et al. |
| 2014/0004939 A1 | 1/2014 | Kasten |
| 2014/0039354 A1 | 2/2014 | Greenwald et al. |
| 2014/0039355 A1 | 2/2014 | Crisco et al. |
| 2014/0039651 A1 | 2/2014 | Crowley |
| 2014/0062773 A1 | 3/2014 | MacGougan |
| 2014/0065962 A1 | 3/2014 | Le |
| 2014/0068847 A1 | 3/2014 | Kitowski |
| 2014/0071221 A1 | 3/2014 | Dave |
| 2014/0080638 A1 | 3/2014 | Feng et al. |
| 2014/0088454 A1 | 3/2014 | Mack |
| 2014/0105084 A1 | 4/2014 | Chhabra |
| 2014/0105466 A1 | 4/2014 | Botes et al. |
| 2014/0107817 A1 | 4/2014 | Ellis et al. |
| 2014/0111352 A1 | 4/2014 | Doherty |
| 2014/0125702 A1 | 5/2014 | Santillan et al. |
| 2014/0139380 A1 | 5/2014 | Ouyang |
| 2014/0141803 A1 | 5/2014 | Marti |
| 2014/0143940 A1 | 5/2014 | Luliano et al. |
| 2014/0155178 A1 | 6/2014 | Bloodworth |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0168477 A1 | 6/2014 | David |
| 2014/0171114 A1 | 6/2014 | Marti |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0218184 A1 | 8/2014 | Grant et al. |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0270375 A1 | 9/2014 | Canavan et al. |
| 2014/0274150 A1 | 9/2014 | Marti |
| 2014/0278218 A1 | 9/2014 | Chang |
| 2014/0283135 A1 | 9/2014 | Shepherd |
| 2014/0293959 A1 | 10/2014 | Singh |
| 2014/0361906 A1 | 12/2014 | Hughes et al. |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0365194 A1 | 12/2014 | O'Hagan et al. |
| 2014/0365640 A1 | 12/2014 | Wohl et al. |
| 2014/0371887 A1 | 12/2014 | Hoffman et al. |
| 2014/0375217 A1 | 12/2014 | Feri et al. |
| 2015/0011242 A1 | 1/2015 | Nagaraj |
| 2015/0026623 A1 | 1/2015 | Horne et al. |
| 2015/0031397 A1 | 1/2015 | Jouaux |
| 2015/0081713 A1 | 3/2015 | Alonso et al. |
| 2015/0131845 A1 | 5/2015 | Forouhar et al. |
| 2015/0187188 A1 | 7/2015 | Raskin |
| 2015/0251074 A1 | 9/2015 | Ahmed et al. |
| 2015/0296272 A1 | 10/2015 | Sonabend et al. |
| 2015/0297649 A1 | 10/2015 | Aman et al. |
| 2015/0297949 A1 | 10/2015 | Aman et al. |
| 2015/0306457 A1 | 10/2015 | Crankson et al. |
| 2016/0001159 A1 | 1/2016 | Riley et al. |
| 2016/0008693 A1 | 1/2016 | Cronin |
| 2016/0012810 A1 | 1/2016 | Cronin |
| 2016/0018278 A1 | 1/2016 | Jeter |
| 2016/0089599 A1 | 3/2016 | Anderson et al. |
| 2016/0096074 A1 | 4/2016 | Moll-Carrillo et al. |
| 2016/0098941 A1 | 4/2016 | Kerluke |
| 2016/0107064 A1 | 4/2016 | Hoffman et al. |
| 2017/0203185 A1 | 7/2017 | Cronin |

FOREIGN PATENT DOCUMENTS

| | | |
|---|---|---|
| CN | 102843186 | 12/2012 |
| EP | 2 407 218 | 1/2012 |
| WO | WO 2008/030484 | 3/2008 |
| WO | WO 2009/104921 | 8/2009 |
| WO | WO 2011/004381 | 1/2011 |
| WO | WO 2012/100053 | 7/2012 |
| WO | WO 2013/011259 | 1/2013 |
| WO | WO 2013/166456 | 11/2013 |
| WO | WO 2014/008134 | 1/2014 |
| WO | WO 2014/052874 | 4/2014 |
| WO | WO 2014/100519 | 6/2014 |
| WO | WO 2016/007969 | 1/2016 |
| WO | WO 2016/007970 | 1/2016 |
| WO | WO 2016/039991 | 3/2016 |

OTHER PUBLICATIONS

No Invasive Soccer Goal Line Technology A real Case Study IEEE conference on computer vision and recognition workshops, (Year: 2013).*

"About Head Case", Head Case Company, Sep. 24, 2013.

"Adidas' miCoach SPEED_CELL and miCoach Football App Aim to Advance the Performance of Next-Generation Athletes Through New Technology", miCoach, Nov. 22, 2011.

"Advanced E-Team: Automatic Sports Time Stopping Whistle", Rose-Hulman Institute of Technology, 2002, NCIIA Funded Advanced E-Teams. Date of Download: Jun. 14, 2014. http://www.nciia.org/WebObjects/NciiaResources.woa/wa/View/GrantProfile?n=1000037.

"Affordable Concussion Management System for Young Athletes Offered by Head Case", Head Case Company, Sep. 24, 2013.

Ancona et al., N.; "Goal detection in football by using Support Vector Machines for classification" Neural Networks, vol. 1, pp. 611-616, 2001.

"AutoScout" ADSC Illinous at Singapore Pte Ltd. Sep. 21, 2015.

Belzer, Jason; "NFL Partners With Zebra Technologies to Provide Next Generation Player Tracking", Forbes/Sports Money, Jul. 31, 2014.

Brolinson et al., P. Gunner; "Analysis of Linear Head Accelerations from Collegiate Football Impacts", Current Sports Medicine Reports, 2006, vol. 5:23-28.

"Chapter 29. Outdoor Laser Operations", U.S. Department of Transportation, Feb. 9, 2012.

(56) References Cited

OTHER PUBLICATIONS

Cooley, Chris; "MMQB: Smart Football", The Official Blog of Chris Cooley, Jul. 13, 2009.http://chriscooley47.blogspot.com/2009/07/mmqb-smart-football.html.
"Create Innovative SERVICES with PLAY APPs", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Dawson, Keith; "LiFi in the Real World" All LED Lighting—Illuminating the Led Community, Jul. 31, 2013.
Delgado, Rick; "Why Fantasy Football Is Embracing Big Data", Sporttechie, Jan. 3, 2014.
"Dutch Football Fans Get the Ajax Experience With AV Technology From Electrosonic", Electrosonic Press Release, May 14, 2012.
FAQ, Go Pro Workouts, Date of Download: Apr. 30, 2014 https://www.goproworkouts.com/faqs.
"First Down Laser Systems to enhance game of football and fans in-stadium experience with green line", Sports Techie, Sep. 9, 2013.
"Football Workout Programs", Go Pro Workouts. Date of Download: Apr. 27, 2014 https://www.goproworkouts.com/workouts/football.
Freeman, Mark; "Frickin' Laser Beams", River Valley Leader, Feb. 19, 2013.
Gerhardt, Ryan; "Concussion Sensing Helmet Could Save Athletes", PSFK, Oct. 28, 2013.
Gerhardt, Ryan; "Vibrating Jersey Lets Fans Feel What Players Do on the Field", PSFK.com, Mar. 13, 2014.
"GoalControl to provide goal-line system at World Cup in Brazil", BBC Sport, Apr. 2, 2013.
Gorman, Michael; "Outstanding Technology brings visible light communication to phones and tablets via dongle and LEDs", Edgadget International Editions, Jul. 16, 2012.
"Growing data sets alter Sportsvision's real-time viewing experience", Sports Illustrated, More Sports, Nov. 29, 2013.
Haas, Harald; "Delivering safe and secure wireless communications", pureLiFi. Date of download: Jan. 16, 2014 http://purelifi.co.uk/.
"How to compare personal stats with the Pros?", Support Home Discussions Training with miCoach. Jul. 4, 2012.
"How to wear the Stride Sensor (inside the shoe)", by micoach, Guides & Tutorials, May 29, 2014.
Inamoto et al., Naho; "Immersive Observation of Virtualized Soccer Match at Real Stadium Model", Proceedings of the Second IEEE and ACM International Symposium on Mixed and Augmented Reality (ISMAR '03), 2003.
"Intel, NFL Legend Jerry Rice and others Team Up to "Look Inside the Huddle" On and Off the Field", by INTELPR in Intel Newsroom, Aug. 28, 2013.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
La Confora, Jason; "NFL collecting data that could revolutionize websites, video games", CBS Sports—NFL Insider, Nov. 25, 2012.
Laviers, Kennard R.; Sukthankar, Gita; "Using Opponent Modeling to Adapt Team Play in American Football", Plan, Activity, and Recognition, Elsevier, 2014. School of ECE, Air Force Institute of Technology. Preprint submitted: Oct. 31, 2013.
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
Macleod, Robert; "New football helmet sensors monitor brain injuries", The Globe and Mail, Nov. 14, 2013.
Madden, Lance; "Pro Athletes Share Personal Workout Secrets With Startup 'Go Pro Workouts'", Forbes.com, SportsMoney. Mar. 4, 2013.
Maricle, Charles; "Federal rules for outdoor laser user in the U.S. (FAA authority over airspace)", Laser PointerSafety.com, Apr. 23, 2014.
"Methods to Our Madness", Football Outsiders Information, Innovative Statistics, Intelligent Analysis, http://www.footballoutsiders.com/info/methods, Date of Download: Apr. 10, 2014.
Miller, Mark J.; "NFL Sensors Will Track Player Stats for Fans, but What About Safety?", Sports in the Spotlight—brandchannel, Aug. 11, 2014.
Montero, Eric, "Design and Implementation of Color-Shift Keying for Visible Light Communications", Sep. 2013, McMaster University.
Morgan, Debra; "Referee Uses Capital Idea to Stop Game Clocks on a Whistle", Loca News. Nov. 18, 1999. http://www.wral.com/news/local/story/138889.
Naidu, Vinaya; "Watched the IPL? Now Find and Tag Yourself in the Stadium With Vodafone Fancam", Business 2 Community, May 22, 2013.
"New courtside technology unveiled at PISD tourney", Precision Time Systems—New Inventions That Prevent Human Errors in Sports Timekeeping, Date of Download: Apr. 23, 2014.
Nguyen et al., "A Novel like switching scheme using pre-scanning and RSS prediction in visible light communication networks", EURASIP Journal on Wireless Communications and Networking, 2013.
"Nike+ SportBand User's Guide", by nikeplus.com, Jun. 7, 2014.
"Nokia Lumia 920 pricing compared to iPhone 5 and Samsung Galaxy SIII", by Nokia, Sep. 30, 2012.
Ogawa; "Article about VLC Guidance developed", Visible Light Communications Consortium (VLCC), Aug. 31, 2012.
Ogawa; "iPhone app from CASIO", Visible Light Communications Consortium (VLCC), Apr. 26, 2012.
Ogus, Simon; "SportIQ Announces a Game Changing Real-Time Basketball Analytics Platform", Sporttechie.com, Mar. 7, 2014.
"Omega introduces new timing equipment for ice hockey at Sochi 2014 Olympic Winter Games", Omega Watches, Feb. 16, 2014.
"Outdoor Laser Operations", Advisory Circular, U.S. Department of Transportation, Dec. 30, 2014.
Perin et al., Charles; "Real-Time Crowdsourcing of Detailed Soccer Data", IEEE, Oct. 2013.
Povey, Gordon, "VLC for Location, positioning and navigation", Jul. 27, 2011, http://visiblelightcomm.com/vlc-for-location-positioning-and-n . . . .
"Riddell InSite Impact Response System", Riddell InSite. Oct. 18, 2013.
Roble, Bob; "Inside the Huddle: How Big Data Is Unlocking Fantasy Football Insights", IQ Sports—Sports Technology, Sep. 3, 2013.
Saag, Tonis; "You can compare your training data with friends again", SportlyzerBlog, Feb. 20, 2013.
"What is SafeBrain", SafeBrain Systems Inc. May 14, 2014.
Schoonmaker, Aaron; "NCAA ignoring own clock recommendations in tourney", WRALSportsFan.com, Mar. 25, 2014 http://www.wralsportsfan.com/ncaa-ignoring-own-clock-recommendations-in-tourney/13510770/.
"Smartabase—The complete solution for athlete data management", Fusion Sport, www.fusionsport.com, Jul. 21, 2011.
"Sports Event Services—Quality Information is the first gold medal at any event", Infostrada Sports, May 24, 2013.
Stein, Anne; "Devices help alert teams to potential concussions on the field", Tribune Newspapers, Jun. 27, 2012.
Thanigavel, M.; "Li-Fi Technology in Wireless Communication", International Journal of Engineering Research & Technology (IJERT), ISSN: 2278-0181, vol. 2 Issue 10, Oct. 2013.
"The Head Case Impact Sensor", Head Case Company, Sep. 24, 2013.
"The System Models & How They Work", Precision Time Systems—New Inventions That Prevent Human Errors in Sports Timekeeping, Date of Download: Apr. 24, 2014.

(56) References Cited

OTHER PUBLICATIONS

"The Wearables Coaching an Optimal Version of You", by PSFK Labs, iQ, Feb. 24, 2014.
"Train like professional athletes", Go Pro Workouts. Date of Download: Apr. 30, 2014 https://www.goproworkouts.com/.
"Viewing other miCoach stats", Support Home Discussions Training with miCoach, Jun. 26, 2012.
WKO—Hunter Allen—Peaks Coaching Group Oct. 14, 2015.
"Wirless Whistle System", Bodet Sport, Sport Display—Timer. Date of Download: Jun. 23, 2014 file:///Cl/king/AOP/Wireless%20Whistle%20system .htm[Jun. 23, 2014 7:32:06 PM].
Won, Eun Tae; "Visible Light Communication: Tutorial", Project: IEEE P802.15 Working Group for Wireless Personal Area Networks (WPANs), Mar. 9, 2008.
"Link: Would You Like to See the Goal-Post Lengthened in Height in College Football", TideFans.com, May 6, 2014. http://www.tidefans.com/forums/showthread.php?t=222422&page=4.
PCT Application No. PCT/US2015/033613 International Search Report and Written Opinion dated Sep. 1, 2015.
PCT Application No. PCT/US2015/040228 International Search Report and Written Opinion dated Sep. 30, 2015.
PCT Application No. PCT/US2015/040229 International Search Report and Written Opinion dated Oct. 1, 2015.
PCT Application No. PCT/US2015/047059 International Search Report and Written Opinion dated Nov. 9, 2015.
U.S. Appl. No. 14/798,049 Office Action dated Nov. 3, 2015.
U.S. Appl. No. 14/798,081 Office Action dated Sep. 28, 2015.
U.S. Appl. No. 14/798,091 Office Action dated Sep. 22, 2015.
U.S. Appl. No. 14/788,728 Office Action dated Sep. 17, 2015.
U.S. Appl. No. 14/788,742 Office Action dated Sep. 2, 2015.
U.S. Appl. No. 14/798,035, filed Jul. 13, 2015, John E. Cronin, Playbook Processor.
PCT/US15/40228, Playbook Processor, Jul. 13, 2015.
U.S. Appl. No. 14/798,049, filed Jul. 13, 2015, John E. Cronin, Whistle Play Stopper.
PCT/US15/40229, Whistle Play Stopper, Jul. 13, 2015.
U.S. Appl. No. 14/798,0057, filed Jul. 13, 2015, John E. Cronin, Professional Workout Simulator.
U.S. Appl. No. 14/798,068, filed Jul. 13, 2015, John E. Cronin. Player Hit System.
U.S. Appl. No. 14/798,081, filed Jul. 13, 2015, John E. Cronin, Smart Field Goal Detector.
U.S. Appl. No. 14/798,091, filed Jul. 13, 2015, John E. Cronin, Real-Time Data Collection and Selective Storage.
U.S. Appl. No. 14/798,131, John E. Cronin, Real-Time Data Collection and Storage for Use in Fantasy Football.
U.S. Appl. No. 14/798,270, filed Jul. 13, 2015, John E. Cronin, Sensor Experience Shirt.
U.S. Appl. No. 14/798,204, filed Jul. 13, 2015, John E. Cronin, Movement Monitoring Unit.
U.S. Appl. No. 14/798,190, filed Jul. 13, 2015, John E. Cronin, Player Movement Data Drives Video Game.
PCT/US15/47059, Facial Recognition for Event Venue Cameras, Aug. 26, 2015.
U.S. Appl. No. 14/788,728, filed Jun. 30, 2015, John E. Cronin, Player Movement Data.
U.S. Appl. No. 14/788,742, filed Jun. 30, 2015, John E. Cronin, Event Video Capture.
U.S. Appl. No. 14/798,049 Final Office Action dated Mar. 22, 2016.
U.S. Appl. No. 14/798,091 Office Action dated Mar. 28, 2016.
U.S. Appl. No. 14/798,035 Office Action dated Nov. 24, 2015.
U.S. Appl. No. 14/798,068 Office Action dated Nov. 23, 2015.
U.S. Appl. No. 14/798,131 Office Action dated Jan. 12, 2016.
U.S. Appl. No. 14/798,204 Office Action dated Jan. 22, 2016.
U.S. Appl. No. 14/798,190 Office Action dated Jan. 12, 2016.
U.S. Appl. No. 14/788,728 Final Office Action dated Feb. 1, 2016.
U.S. Appl. No. 14/788,742 Final Office Action dated Jan. 6, 2016.
U.S. Appl. No. 14/798,068 Final Office Action dated May 5, 2016.
U.S. Appl. No. 14/798,131 Final Office Action dated May 23, 2016.
U.S. Appl. No. 14/798,204 Final Office Action dated May 11, 2016.
U.S. Appl. No. 14/788,742 Office Action dated May 11, 2016.
U.S. Appl. No. 15/091,139, filed Apr. 5, 2016, John E. Cronin, Sensor Experience Garment.
U.S. Appl. No. 15/187,100, filed Jun. 20, 2016, John E. Cronin, Smart Field Goal Detector.
U.S. Appl. No. 14/798,091 Office Action dated Aug. 18, 2016.
U.S. Appl. No. 14/798,190 Final Office Action dated Jul. 25, 2016.
U.S. Appl. No. 14/788,728 Office Action dated Jul. 13, 2016.
U.S. Appl. No. 14/798,131 Office Action dated Sep. 20, 2016.
U.S. Appl. No. 14/798,068 Office Action dated Sep. 28, 2016.
U.S. Appl. No. 14/788,728 Final Office Action dated Dec. 6, 2016.
U.S. Appl. No. 15/333,711, filed Oct. 25, 2016, John E. Cronin, Professional Workout Simulator.
U.S. Appl. No. 15/091,139 Office Action dated Jan. 11, 2017.
U.S. Appl. No. 14/798,204 Office Action dated Dec. 20, 2016.
Spagnolo et al, "Non-Invasive Soccer Goal Line Technology: A Real Case Study," 2013 IEEE Conference on Computer Vision and Pattern Recognition Workshops.
U.S. Appl. No. 15/187,100 Office Action dated Apr. 14, 2017.
U.S. Appl. No. 14/798,091 Final Office Action dated May 2, 2017.
U.S. Appl. No. 14/798,131 Final Office Action dated Mar. 21, 2017.
U.S. Appl. No. 14/798,204 Final Office Action dated Apr. 11, 2017.
U.S. Appl. No. 14/798,190 Office Action dated Mar. 8, 2017.
U.S. Appl. No. 14/788,728 Office Action dated May 10, 2017.
U.S. Appl. No. 15/479,151, filed Apr. 4, 2017, John E. Cronin, Playbook Processor.
U.S. Appl. No. 15/479,151 Office Action dated May 30, 2017.
U.S. Appl. No. 14/798,091 Office Action dated Oct. 3, 2017.
U.S. Appl. No. 14/798,204 Office Action dated Dec. 1, 2017.
U.S. Appl. No. 14/798,190 Final Office Action dated Dec. 15, 2017.
U.S. Appl. No. 14/788,728 Final Office Action dated Nov. 24, 2017.
U.S. Appl. No. 15/333,711 Office Action dated Nov. 16, 2018.
U.S. Appl. No. 14/798,190 Final Office Action dated Nov. 1, 2018.
U.S. Appl. No. 14/798,190 Office Action dated Apr. 19, 2018.

\* cited by examiner

FACIAL RECOGNITION FOR EVENT VENUE CAMERAS

CROSS-REFERENCE TO RELATED APPLICATIONS

The present application claims the priority benefit of U.S. provisional application No. 62/047,937 filed Sep. 9, 2014 entitled "Fan Photo Stadium Triggers," and of U.S. provisional application No. 62/048,938 filed Sep. 11, 2014 entitled "VLC Fan In Games," the disclosures of which are hereby incorporated by reference.

BACKGROUND

Field of Invention

The present invention generally relates to event venue security systems. More specifically, the present invention relates to event venue security systems that wirelessly transmit security information to security personnel and to eventgoers.

Description of the Related Art

Event venues (e.g., sports stadiums/arenas, concert/theatre auditoriums), typically host exciting events that eventgoers enjoy attending. Eventgoers often like to take photos of themselves, their friends, their significant others, or their families during events hosted at event venues, either to keep their personal collections or to post on social media platforms such as Facebook, Twitter, Instagram, or Snapchat.

Event venues sometimes have cameras, though such cameras are typically trained on a performance area (e.g., a sports field/court, a concert/theatre stage) in order to record a performance or game for the purpose of broadcasting it on television or selling recorded copies of the performance. Such cameras are typically not trained on the eventgoers attending and watching the event, who typically sit or stand in a separate eventgoer area (e.g., stadium seating, auditorium or theatre seating). Individuals who are recorded by such event venue cameras generally do not know that they have been recorded unless they or someone who recognizes them watches the relevant camera feed.

Facial recognition software is sometimes used to recognize an individual's face based on previously stored example photos of the individual's face. Such software is typically used in biometric security systems or surveillance systems.

Eventgoers commonly own user devices, such as smartphone devices or tablet devices, and often carry such devices on their person to event venues while attending events. Such user devices can often send and accept wired or wireless communications via a network, such as a local area network (LAN) or wireless local area network (WLAN), or via the Internet.

Traditionally, the field of digital communications includes wired and wireless transfer of information. Digital communications may include direct communications in which information is transmitted from a sender device to a recipient device, and may also include "indirect" communications in which information is transmitted from a sender device, through one or more "intermediary" or "middleman" devices, and eventually to a recipient device.

One example of wired transfer includes data transmitted from a sender device to a recipient device using a Universal Serial Bus (USB) cable. Another example of a wired transfer includes data transmitted within a private Local Area Network (LAN) from a sender device to a router through a sender Ethernet cable, and from the router to a recipient device through a recipient Ethernet cable.

One example of wireless transfer includes data transmitted from a sender device to a recipient device using a Bluetooth protocol connection. Another example of a wired transfer includes data transmitted within a private Wireless Local Area Network (WLAN) from a sender device to a router through a wireless Wi-Fi connection, and from the router to a recipient device through a wireless Wi-Fi connection. Other examples of wireless transfer include Bluetooth communications, Visible Light Communications (VLC), radio wave communications, microwave communications, or sound-based communications.

Thus, an improved event venue camera system with facial recognition is needed.

SUMMARY OF THE CLAIMED INVENTION

One exemplary method for event venue camera usage includes detecting an event occurrence in a performance area of an event venue. The method also includes capturing a performance visual media of the event occurrence in the performance area of the event venue using a performance camera. The method also includes capturing an eventgoer visual media of an eventgoer area of the event venue at substantially the same time as the capture of the performance visual media using an eventgoer camera. The method also includes recognizing a face within the eventgoer visual media as substantially matching an eventgoer face of an first eventgoer based on at least one reference photograph of the eventgoer face of the first eventgoer. The method also includes transmitting the eventgoer visual media and the performance visual media to a user device associated with the first eventgoer.

One exemplary system for event venue camera usage includes one or more eventgoer cameras, one or more performance cameras, and an eventgoer photo network. Execution of instructions stored in a memory of the eventgoer photo network by a processor of the eventgoer photo network performs various system operations. The system operations include detecting an event occurrence in a performance area of an event venue. The system operations also include capturing a performance visual media of the event occurrence in the performance area of the event venue using the one or more performance cameras. The system operations also include capturing an eventgoer visual media of an eventgoer area of the event venue at substantially the same time as the capture of the performance visual media using the one or more eventgoer cameras. The system operations also include recognizing a face within the eventgoer visual media as substantially matching an eventgoer face of an first eventgoer based on at least one reference photograph of the eventgoer face of the first eventgoer. The system operations also include transmitting the eventgoer visual media and the performance visual media to a user device associated with the first eventgoer.

One exemplary non-transitory computer-readable storage medium is also described, the non-transitory computer-readable storage medium having embodied thereon a program executable by a processor to perform an exemplary program method for event venue camera usage that includes detecting an event occurrence in a performance area of an event venue. The program method also includes capturing a performance visual media of the event occurrence in the performance area of the event venue using a performance camera. The program method also includes capturing an eventgoer visual media of an eventgoer area of the event venue at substantially the same time as the capture of the performance visual media using an eventgoer camera. The program method also includes recognizing a face within the eventgoer visual media as substantially matching an eventgoer face of an first eventgoer based on at least one reference photograph of the eventgoer face of the first eventgoer. The program method also includes transmitting the eventgoer visual media and the performance visual media to a user device associated with the first eventgoer.

DETAILED DESCRIPTION

An event venue with a performance area (e.g., a sport field or auditorium stage) and an eventgoer area (e.g., stadium seating or bleachers) may include a set of eventgoer cameras trained on various sections of the eventgoer area and a set of performance cameras trained on the performance area. The event venue may also include sensors. When an event occurrence (e.g., a goal or touchdown) is detected using the cameras and/or sensors, at least one photo or video of the event occurrence may be captured by the performance cameras, and at least one photo or video of the eventgoer reaction may be captured using the eventgoer cameras. Facial recognition may then be used to identify particular eventgoers in each photo or video. Identified eventgoers can then receive photos or videos in which they are identified along with performance photos or videos that were captured at roughly the same time.

Figure 1:
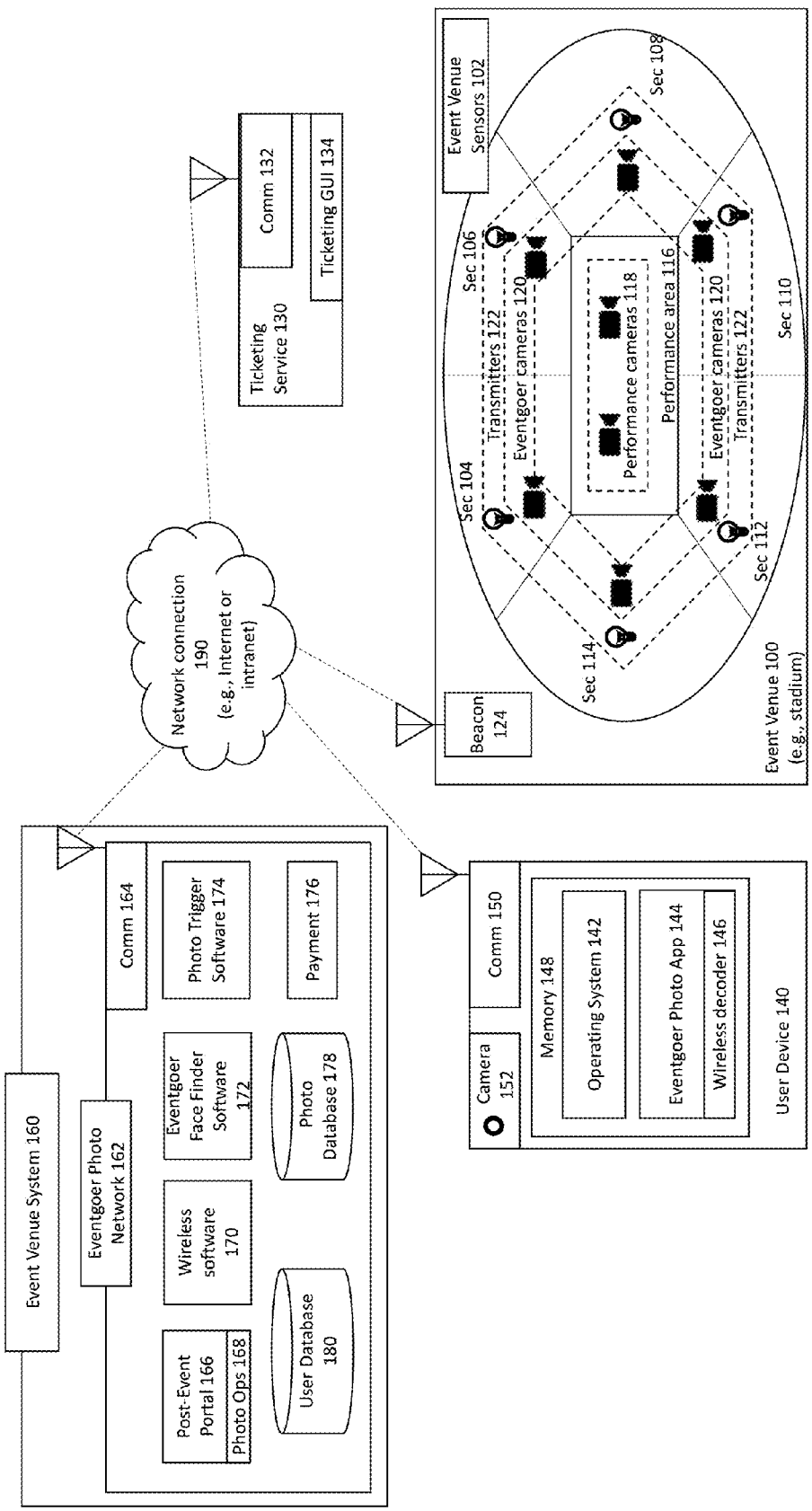
FIG. 1 illustrates an event venue camera ecosystem.

FIG. 1 illustrates an event venue camera ecosystem.

The event venue camera ecosystem of FIG. 1 includes an event venue 100. The event venue 100 may be any type of event venue used to host any type of event, public or private. For instance, the event venue may be a venue for any type of entertainment or cultural events that are presented at a theater, gymnasium, church, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like.

The event venue 100 of FIG. 1 includes two performance cameras 118, which are cameras trained on a performance area of the event venue, such as a field or court of a sports venue or a stage of an auditorium or theatre or lecture hall or a pulpit of a church or political/legislative/judicial building. The event venue 100 of FIG. 1 also includes six eventgoer cameras 120, which are cameras that are each trained on one or more eventgoers in one or more eventgoer-camera-view areas. Eventgoer-camera-view areas may include areas that include eventgoers in bleachers, stadium seats, auditorium seats, concert seats, lecture hall seats, standing room floors, or some combination thereof.

The entire eventgoer area of event venue 100 of FIG. 1 is divided into six eventgoer sections, identified as section 104, section 106, section 108, section 110, section 112, and section 114. These may be physically separated sections, such as separate bleacher sections or separate balconies or separate seating sections or separate standing room floors, or they may be symbolic divisions (e.g., representing eventgoer-camera-view areas, fractional or geographical divisions of the event venue eventgoer area, ticket-price divisions based on different seats prices in certain eventgoer sections, or arbitrary divisions). In the event venue camera ecosystem of FIG. 1, each eventgoer section includes a single eventgoer camera of the set of eventgoer cameras 120, but in other cases an eventgoer section may lack a eventgoer camera or have more than one eventgoer camera.

The eventgoer cameras 120 and performance cameras 118 may be cameras capable of taking photographs, video, or both. The photographs and/or video recordings captured by the eventgoer cameras 120 and performance cameras 118 may be captured over a light capture spectrum that includes at least part of the visible light spectrum, and may also (or alternately) include at least part of the infrared light spectrum or ultraviolet light spectrum. The eventgoer cameras 120 and performance cameras 118 may also capture sound through microphones, and may include other sensors (e.g., motion sensors). Each camera of the eventgoer cameras 120 and performance cameras 118 may record its captured camera feed on a memory system 720, a mass storage system 730, a portable storage system 740, or an analog visual storage medium such as a videotape or a negative. Each camera of the eventgoer cameras 120 and performance cameras 118 may transmit data, such as photograph data or video/audio data, via a wired or wireless transceiver.

The event venue 100 of FIG. 1 also includes a set of transmitters 122. Each transmitter of the transmitters 122 may optionally be paired with a specific eventgoer camera of the eventgoer cameras 120, or may be independent of the eventgoer cameras 120, or may alternately be missing entirely from the event venue camera ecosystem. The transmitters may be used to transmit camera feed data from one or more of the eventgoer cameras 120 and/or one or more of the performance cameras 118 to one or more user devices 140 used by eventgoers.

The transmitters 122 may be wireless transmitters capable of transmitting data wirelessly using one or more of a variety of wireless communication technologies. For example, each transmitter of the transmitters 122 may wirelessly transmit data using a Wi-Fi connection module, a 3G/4G/LTE cellular connection module, a Bluetooth connection module, a Bluetooth low energy connection module, Bluetooth Smart connection module, a near field communication (NFC) module, a radio wave communications module, a microwave communications module, a magnetic induction transmitter, a magnetic resonance transmitter, an electromagnetic radiation transmission module, a visible light communication (VLC) transmission lamp/laser/module, a speaker (e.g., audible sound transmitter, ultrasonic transmitter, infrasonic transmitter, with or without noise cancelling features), or some combination thereof. Each transmitter of the transmitters 122 may include any number of sub-transmitters.

The event venue 100 of FIG. 1 also includes various event sensors 102. The event sensors 102 may include a microphone to identify a particular sound-based event occurrence (e.g., cheering from a crowd of eventgoers). The event sensors 102 may also include a thermometer to identify a particular heat-based event occurrence (e.g., fireworks or sparklers). The event sensors 102 may also include a speed detector to identify a particular speed-based event occurrence (e.g., a pre-determined speed is surpassed by a racer or athlete). The event sensors 102 may also include a barometer, a humidity sensor, a pressure sensor (e.g., to detect footsteps over a particular area or a ball/puck/Frisbee entering a goal/hole/basket), a light sensor, a motion sensor, a timer, a collision sensor, or another type of sensor. Some of these sensors may work in conjunction with the eventgoer cameras 120 and performance cameras 118; for example, a collision sensor can use computer vision and motion tracking techniques applied to the camera feeds of performance cameras 118 to detect collision-based event occurrence (e.g., a goal/touchdown/basket is scored, a foul/tackle/brawl occurs, a pass is caught or intercepted).

The event venue 100 of FIG. 1 also includes a beacon 124, which may be a router or bridge or other type of network connectivity device. The beacon 124 may connect at least subsets of the various devices associated with the event venue 100 (e.g., the performance cameras 118, the eventgoer cameras 120, the transmitters 122, the event venue sensors 102) to each other and/or to a network connection 190. The network connection 190 may be an Internet connection 190 or an intranet connection 190 to a Local Area Network (LAN) or to a Wireless Local Area Network (WLAN) or to a Municipal Area Network (MAN) or to a Wide Area Network (WAN) through the network connection 190, the beacon 124 can connect the event venue 100 to a ticketing service 130, an event venue system 160, and a user device 140.

The event venue camera ecosystem of FIG. 1 includes the user device 140. The user device 140 may be a computing device 1000 or a device with a subset of components that might be found in a computing device 1000, and may for example be a smartphone device, a tablet device, a laptop computer device, a portable media player device, a portable video game console device, or a portable e-book reader device.

Each user device 140 may be capable of receiving and/or transmitting wireless data through a communication transceiver 150, which may include communication modules such as those described in relation to the beacon 124 of the event venue 100, and may connect to the network connection 190.

Each user device 140 may also include a memory 148, which may include a memory system 1020, a mass storage system 1030, a portable storage system 1040, or some combination thereof. The user device 140 may store various data structures and software elements in the memory 148. Some of these software elements may include an operating system 142, an eventgoer photo software application 144 (e.g., which may interface with the eventgoer photo network 162 of the event venue system 160), and a wireless transmission decoder 146. The user device 140 may also include a camera 152 that is capable of taking photos and/or videos.

The event venue camera ecosystem of FIG. 1 includes the ticketing service 130. The ticketing service 130 may include one or more computer systems 1000, which may be connected together in a network (e.g., LAN or WLAN) or distributed throughout the Internet. The ticketing service 130 systems may be connected to the network connection 190 through one or more communication transceivers 132, which may include communication modules such as those described in relation to the beacon 124 of the event venue 100.

The ticketing service 130 may allow users to the ticketing service 130 to purchase event tickets using a ticketing graphical user interface (GUI) 134, which may be provided through a website or a software application running on a user device 140, for example. The computer systems included as part of the ticketing service 130 may be used to host network-based resources for the ticketing graphical user interface (GUI) 134 and/or provide an application programming interface (API) for software applications running on user devices 140.

The event venue camera ecosystem of FIG. 1 includes the event venue system 160. The event venue system 160 may be associated with the event venue 100 or with an owner of the event venue 100 or with a manager of an event held at the event venue 100. The event venue system 160 may include one or more computer systems 1000, which may be connected together in a network (e.g., LAN or WLAN) or distributed throughout the Internet. The event venue system 160 may be used to execute an eventgoer photo network 162, which may be connected to the network connection 190 through one or more communication transceivers 164, which may include communication modules such as those described in relation to the beacon 124 of the event venue 100. At least a subset of the event venue system 160 may optionally be located at the event venue 100.

The eventgoer photo network 162 may include a variety of software elements and data structures. In particular, the eventgoer photo network 162 may include a post-event portal 166, which may be a software application and/or website that include a graphical user interface (GUI) allowing eventgoers to view eventgoer photos taken (e.g., via one or more eventgoer cameras 120) of themselves in conjunction with event occurrence photos taken (e.g., via one or more performance cameras 118) of particular event occurrences (e.g., event occurrences that took place at roughly the same time or a similar time as the eventgoer photo so as to show the eventgoer's reaction to the event occurrence). The post-event portal 166 may also include or be associated with a photo ops section 168 that may notify the eventgoer regarding when the next photo of the eventgoer is scheduled to be taken (e.g. via one or more eventgoer cameras 120).

The eventgoer photo network 162 may also include a wireless software 170, which may manage transmission of camera feed data (e.g., photos, videos, audio) from the eventgoer cameras 120 and performance cameras 118 to the user devices 140.

The eventgoer photo network 162 may also include an eventgoer face finder software 172, which may identify faces of particular eventgoers within photos or videos taken by one or more of the eventgoer cameras 120, or by the performance cameras 118 if any eventgoers are visible in those photos or videos. In particular, the eventgoer face finder software 172 may use facial recognition software, feature recognition software, and other types of computer vision software. The eventgoer face finder software 172 may recognize the face of an eventgoer based on one or more previously given photos of the eventgoer's face (e.g., generated by cameras within the event venue 100 upon entry by the eventgoer or uploaded by the eventgoer when purchasing the ticket to the event or when completing a user profile for the post-event portal 166 and/or the ticketing service 130).

The eventgoer photo network 162 may also include a photo trigger software 174, which may detect event occurrences by using the performance cameras 118, the eventgoer cameras 120, the event venue sensors 102, or some combination thereof. For example, the photo trigger software 174 may determine that a photo should be taken based on a visually detected collision (e.g., a goal/touchdown/basket is scored, a foul/tackle/brawl occurs, a pass is caught or intercepted), based on a sound (e.g., a crowd of eventgoers cheering, a new song starts playing, a buzzer or whistle is heard), based on crowd movements (e.g., a crowd of eventgoers performs a "wave" crowd movement or other visual cheer, or a performer or eventgoer performs a "crowd-surfing" maneuver), based on a timed schedule (e.g., an absolute schedule defining clock times or a relative schedule defining time interval lengths), based on a manual input by a manager or administrator or eventgoer, or based on some combination thereof.

The eventgoer photo network 162 may also include a payment system 176, which may allow the eventgoer photo network 162 to accept payments from eventgoers electronically via credit card inputs, debit card inputs, bank account inputs, or electronic payment account (e.g., PayPal, VenMo, Stripe, Apple Pay, Google Wallet/Pay, Amazon Payments, Facebook Payments) inputs, or scanned/photographed checks.

The eventgoer photo network 162 may also include a photo database 178, which may store camera feed data (e.g., images, videos, audio, timestamps, metadata) from performance cameras 118 and eventgoer cameras 120. The eventgoer photo network 162 may also include a user database 180, which may store user profile information from the eventgoer photo software application 144 of the user device 140. One or more reference photos that the eventgoer face finder software may use to locate particular a eventgoer's face in the camera feed photos may be stored in the user database 180 alongside the user profile data, but may also (or alternately) be stored in the photo database 178.

Figure 2:
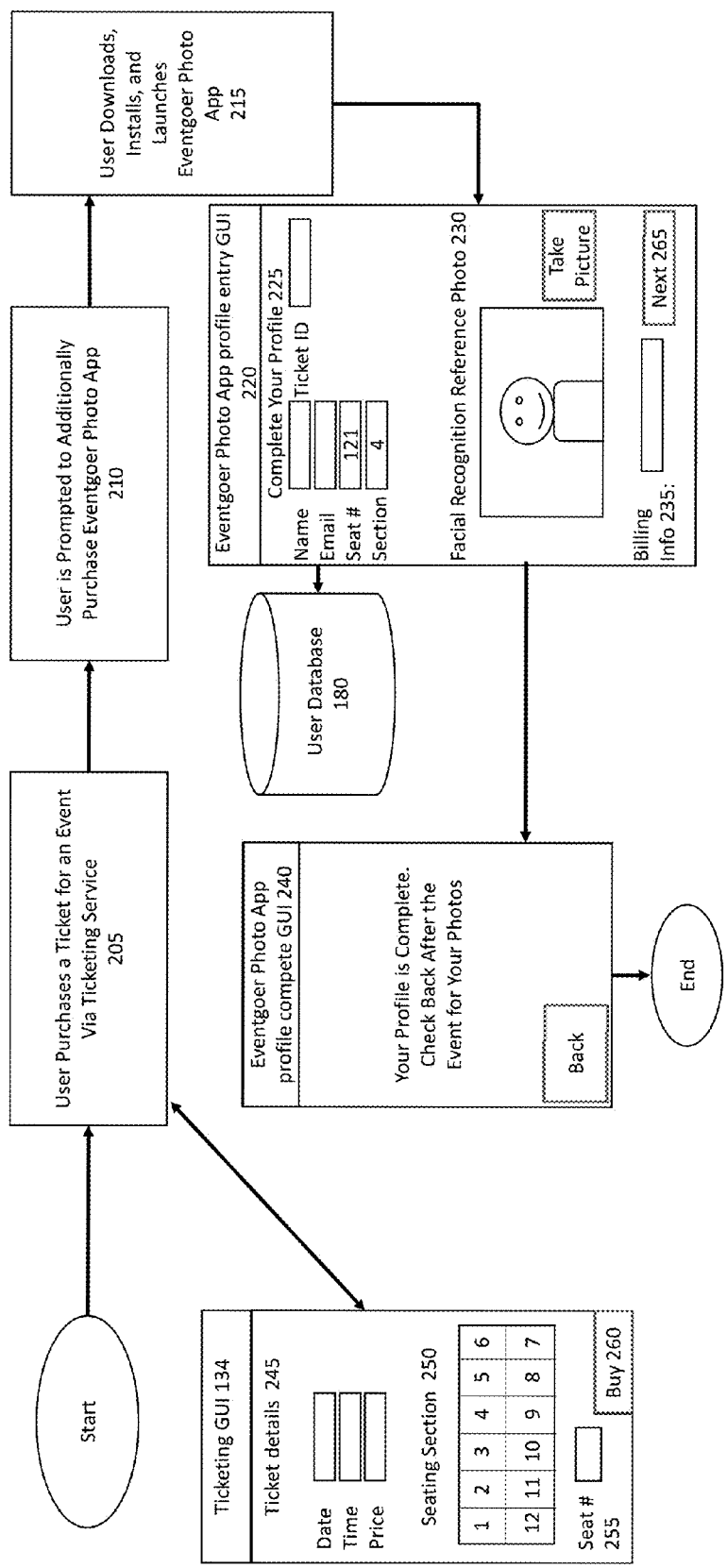
FIG. 2 is a flow diagram illustrating exemplary ticket purchase and user profile operations.

FIG. 2 is a flow diagram illustrating exemplary ticket purchase and user profile operations.

At step 205, a user using a user device 140 purchases a ticket for an event via the ticketing service 130. The ticket may be purchases using a ticketing GUI 134 of the ticketing service 130. The ticketing GUI 134 may include a "ticket details" section 245 identifying a date, time, and price of a ticket, as well as a "seating section" section 250 identifying a particular eventgoer section of the event venue, and a "seat number" section 255 identifying a particular seat number. The ticketing GUI 134 finally includes a "buy" button 260 allowing the user to buy the ticket or tickets with the identified characteristics.

At step 210, the user may be prompted at the user device 140 to buy and/or download the eventgoer photo software application 144. The eventgoer photo software application 144 may cost money or may be free, and may be obtained from a software repository such as an "application store" or an "app store," or may be contained within a website.

At step 215, the user uses the user device 140 to download, install, and launch the eventgoer photo software application 144.

An exemplary eventgoer photo software application profile entry GUI 220 is illustrated in FIG. 2. The eventgoer photo software application profile entry GUI 220 includes a "complete your profile" section 225 identifying a name, email address, seat number, eventgoer section, and ticket ID associated with the user's profile. The eventgoer photo software application profile entry GUI 220 also includes a "facial recognition reference photo" section 230 allowing the user to upload a recently taken or stored photo of the user's face that can then be used by the eventgoer face finder software 172 of the eventgoer photo network 162. The eventgoer photo software application profile entry GUI 220 also includes a "billing info" section 235 allowing the user to input information related to the use of the payment system 176 under the user's profile/account. The eventgoer photo software application profile entry GUI 220 also includes a "next" button 265 that completes entry of the user's profile/account information.

The information input into the eventgoer photo software application profile entry GUI 220 may then be stored in the user database 180 of the eventgoer photo network 162.

Once the "next" button 265 of the eventgoer photo software application profile entry GUI 220 is pressed, the eventgoer photo software application 140 may go to an eventgoer photo software application profile complete GUI 240, in which a message is displayed identifying that the user's profile is complete, and to check back after the event for the user's photos.

Figure 3:
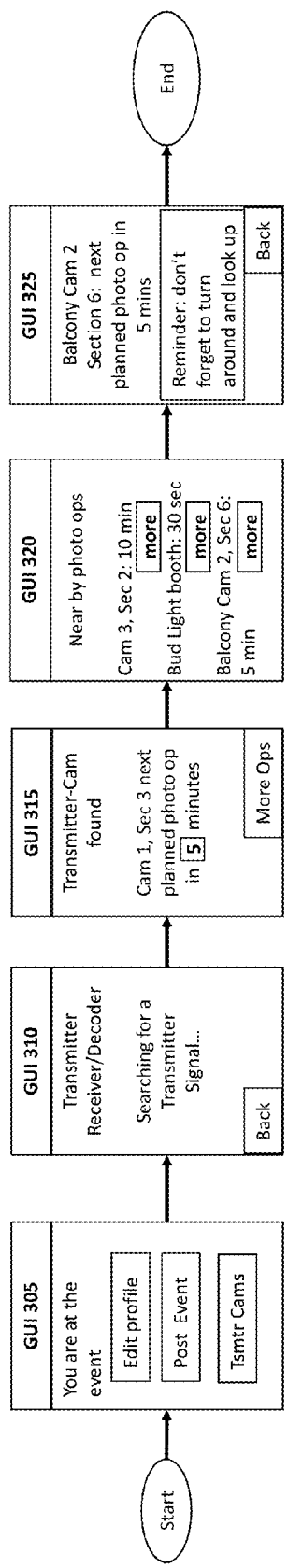
FIG. 3 is a flow diagram illustrating exemplary graphical user interfaces of camera interactions of an eventgoer photo application.

FIG. 3 is a flow diagram illustrating exemplary graphical user interfaces of camera interactions of an eventgoer photo application.

The eventgoer photo software application 144 may include multiple GUIs for various operations and purposes related.

The eventgoer photo software application 144 may include a GUI 305 that identifies that the user is currently at an event at event venue 100. GUI 305 allows the user to edit his/her user profile (e.g., see profile entry GUI 220 of FIG. 2), access the post-event portal 166, or identify and/or interact with one or more of the eventgoer cameras 120 with or without transmitters 122.

The eventgoer photo software application 144 may include a GUI 310 that identifies that the user device 140 running the eventgoer photo software application 144 is currently searching for a transmitter signal for one or more transmitters of the transmitters 122. The GUI 310 may follow from a press of the "Tsmtr Cams" button of GUI 305.

The eventgoer photo software application 144 may include a GUI 315 that identifies that a camera has been found, which may optionally have a transmitter. The GUI 315 then identifies the camera as Camera 1 of Eventgoer Section 3, and identifies that the next planned photo opportunity will occur in five minutes. The GUI 315 may have a "more ops" button that then identifies other photo opportunities. The GUI 315 may follow from the GUI 310.

The eventgoer photo software application 144 may include a GUI 320 that identifies multiple nearby photo opportunities and when they will occur. For example, the GUI 320 identifies that Camera 3 of Eventgoer Section 2 will take a photo in 10 minutes, that a camera at the Bud Light Booth will take a photo in 30 seconds, and that a Balcony Camera 2 in a (Balcony) Eventgoer Section 6 will take a photo in 5 minutes. Each identified camera photo opportunity notification may include a corresponding "more" button for more information. The GUI 320 may follow from a press of the "more ops" button of GUI 315.

The eventgoer photo software application 144 may include a GUI 325 that identifies more information about a particular selected camera. For example, the GUI 325 of FIG. 3 includes more information about the Balcony Camera 2 in a (Balcony) Eventgoer Section 6, identifies that the next planned photo opportunity will be in 5 minutes, and identifies a reminder notification relevant to that camera ("Reminder: don't forget to turn around and look up Reminder: don't forget to turn around and look up") that in some cases may be customizable and trigger a notification at the user device 140 when the photo opportunity time approaches. The GUI 325 may follow from a press of the "more" button next to "Balcony Cam 2, Sec 6: 5 min" of GUI 315.

Figure 4:
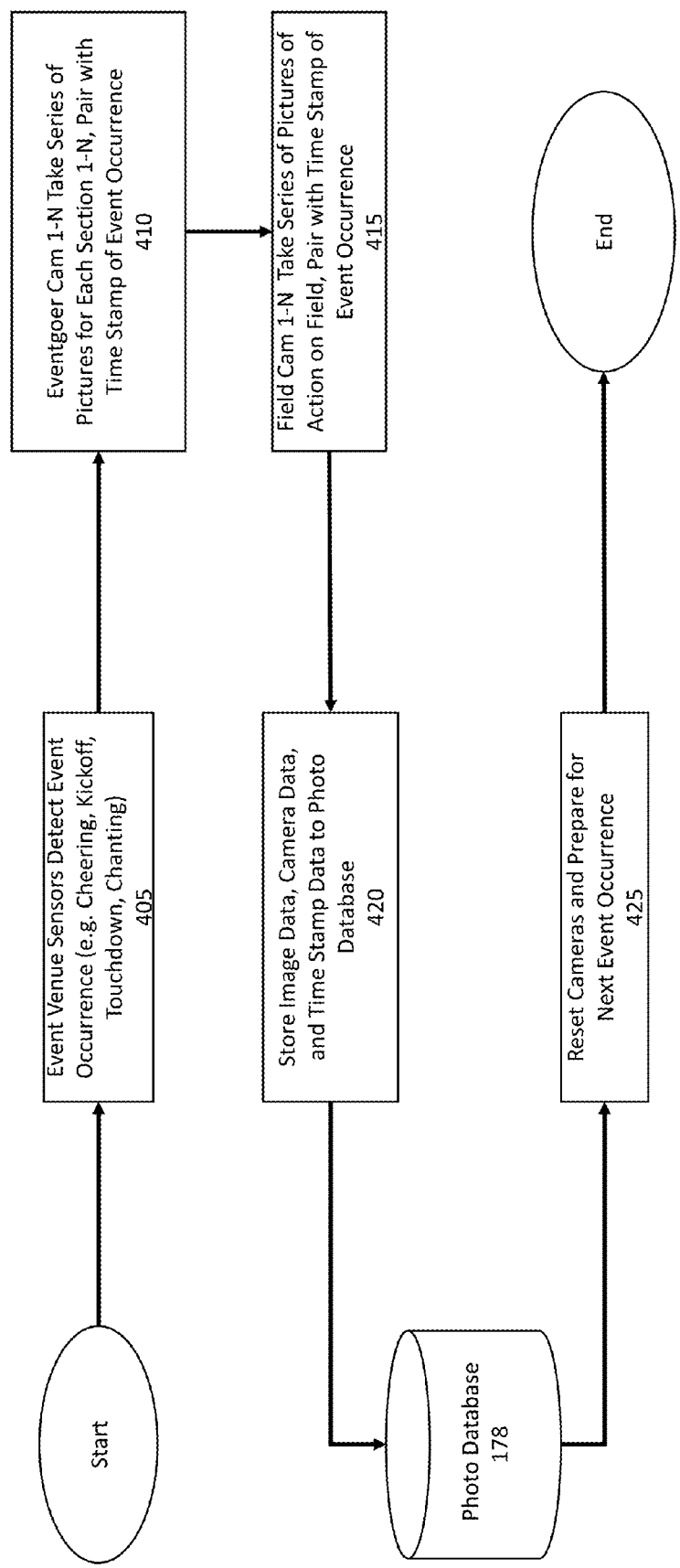
FIG. 4 is a flow diagram illustrating exemplary operations of a photo trigger software.

FIG. 4 is a flow diagram illustrating exemplary operations of a photo trigger software.

At step 405, the event venue seniors 102 (e.g., optionally in conjunction with the performance cameras 118 and/or eventgoer cameras 120) can detect an event occurrence, such as an eventgoer crowd cheer, a kickoff, a touchdown/goal, an eventgoer crowd chant, a scheduled photo opportunity (e.g., based on a clock or timer), or any other event occurrence described previously.

At step 410, one or more eventgoer cameras of the eventgoer cameras 120 (e.g., identified by camera numbers 1 through N) take one or more photos or videos for each of a set of one or more eventgoer sections (e.g., identified by section numbers 1 through N), which are paired with a time stamp either marked on each photo/video itself or included within the metadata of each photo/video.

At step 415, one or more performance cameras of the performance cameras 118 (e.g., identified by camera numbers 1 through N) take one or more photos or videos of the performance area 116, which are paired with a time stamp either marked on each photo/video itself or included within the metadata of each photo/video.

At step 420, the images/videos, camera data (e.g., image/video metadata and data identifying each camera by number and/or location), and time stamp data are stored in the photo database 178 of the eventgoer photo network 162 at the event venue system 160.

At step 425, the cameras may reset if necessary and prepare for the next event occurrence.

Figure 5:
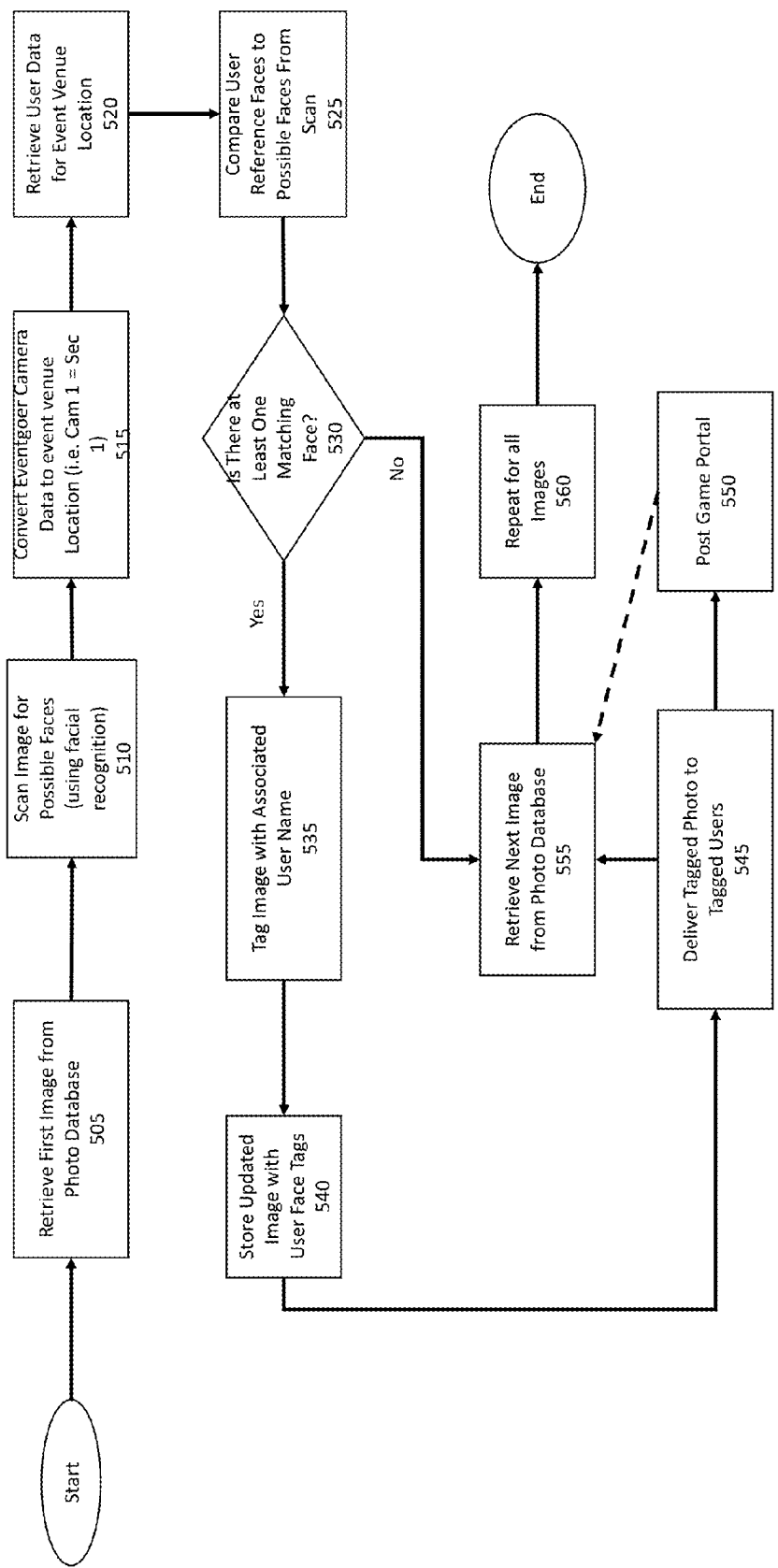
FIG. 5 is a flow diagram illustrating exemplary operations of an eventgoer face finder software.

FIG. 5 is a flow diagram illustrating exemplary operations of an eventgoer face finder software.

At step 505, a first image (e.g., a photograph or a video frame from one of the cameras of the set of eventgoer cameras 120 or of the set of performance cameras 118) is retrieved from the photo database 178.

At step 510, the first image is scanned using a first pass of a facial recognition algorithm to detect human faces within in the image.

At step 515, the camera data can be analyzed to determine an eventgoer section number that the camera's viewing area includes, and in some cases, the camera feed data can also be analyzed to determine individual seat numbers and who should be sitting in them based on the tickets sold.

At step 520, user data is retrieved from the user database 180, including user reference photos of users' faces.

At step 525, the first image, and the human faces detected within it at step 510, are compared to the user reference face photos that were pulled from the user database 180 in step 520.

At step 530, the eventgoer face finder software 172 determines whether there was at least one match found in the comparison of step 525.

If there were no matching faces detected at step 530, then at step 555, the next image (e.g., the next photograph or video frame) from the photo database 178. As specified in step 560, the operations of FIG. 5 are then repeated for all images in the photo database 178.

If there was at least one matching face detected at step 530, then at step 535, the first image is tagged with the associated user's name, username, email, phone number, account, profile identifier, or other profile information. The tag may be a marking on the first image, information stored in the photo database 178, or information stored in metadata associated with the first image.

At step 540, the face tags are stored, in the form of an updated image (e.g., if the tag is in the form of a marking on the first image or information stored in metadata associated with the first image) and/or an updated entry in the photo database 178 (e.g., if the tag is in the form of information stored in the photo database 178).

At step 545, the tagged photo is delivered to tagged users, and in particular, to user devices 140 belonging to the tagged users. The tagged images may be delivered directly to the user devices 140 via one or more of the transmitters 122, either relatively immediately or after the event is over. The tagged images may also or alternately be uploaded, at step 550, to the post-game portal 166.

After step 545 or step 550, the eventgoer face finder software 172 may perform step 555, in which it retrieves the next image (e.g., the next photograph or video frame) from the photo database 178. As specified in step 560, the operations of FIG. 5 are then repeated for all images in the photo database 178.

Figure 6:
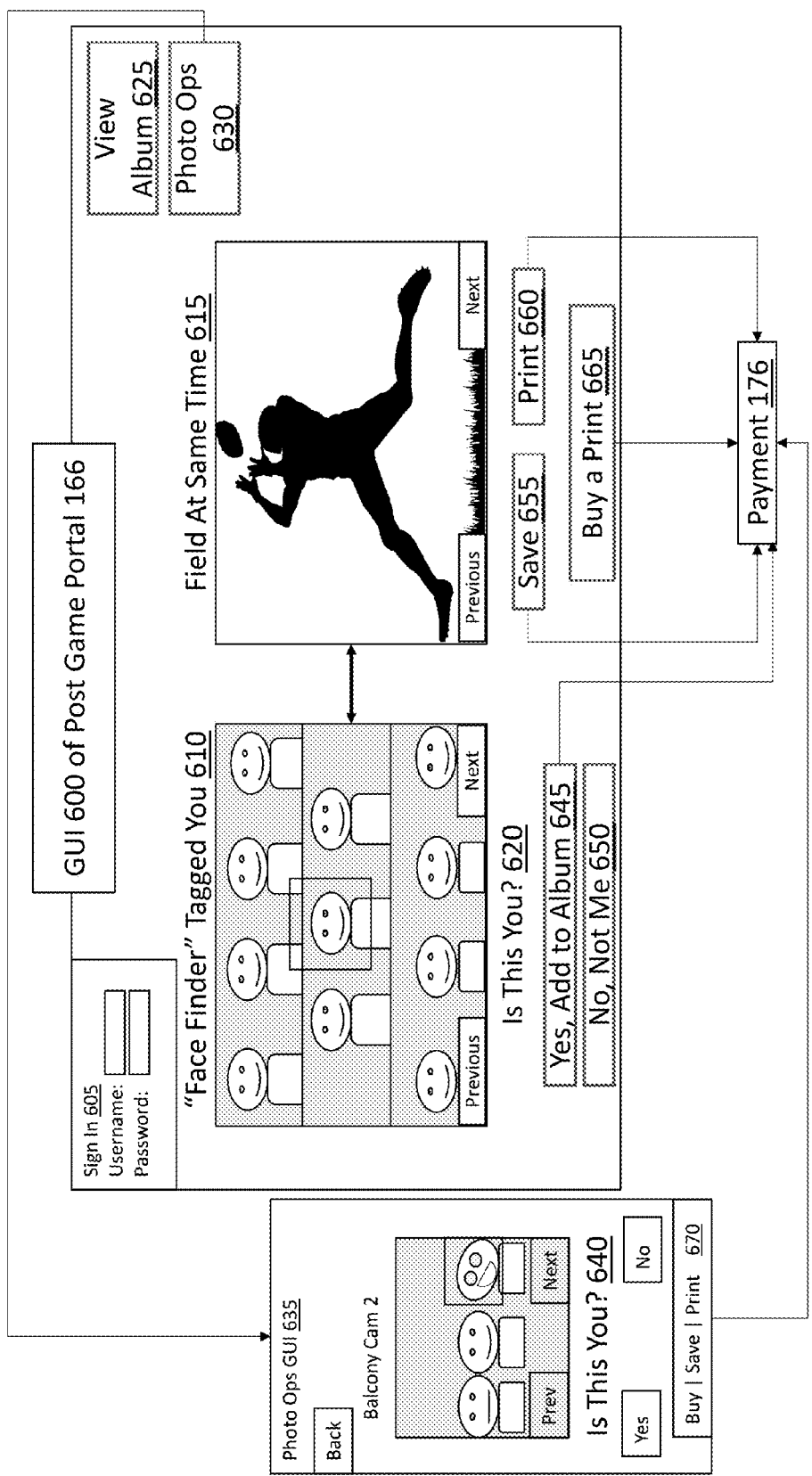
FIG. 6 illustrates an exemplary graphical user interface for a post-game portal.

FIG. 6 illustrates an exemplary graphical user interface for a post-game portal.

The GUI 600 of the post-game-portal 166 of FIG. 6 includes a variety of GUI elements. In particular, the GUI 600 includes a sign-in section 605, allowing a user to sign in using sign-in credentials such as a username and password (alternate sign-in sections can request an email and password, or a certificate signed by a certificate authority, or a biometric scan).

The GUI 600 includes a "'Face Finder' Tagged You" section 610, in which an image from the photo database 178 that depicts one or more eventgoers, one of which was identified by the eventgoer face finder software 172 to match a reference photo of the user, is presented. An "Is this You?" section is also presented, allowing confirmation from the user via a "Yes, Add to Album" button 645 or negation via a "No, Not Me" button 650. Images that are confirmed by the user as depicting the user can then be added to a multimedia album associated with the user. If the image is a frame of a video, the entire video can be added to the multimedia album associated with the user. Other frames of the video then may or may not require separate confirmation via similar "Is this You?" 620 queries.

A "field at same time" section 615 may include an image or video that is also presented to the user, which may show a photo, a video, or a video frame of the performance area 116 as captured by one or more of the performance cameras 118 at substantially the same time as the image in the "'Face Finder' Tagged You" section 610 was captured. The "field at same time" section 615 may provide context for the "'Face Finder' Tagged You" section 610; for example, the "field at same time" section 615 may show a photo of an exciting goal or touchdown or song finale, and the "'Face Finder' Tagged You" section 610 may show a photo of the user reacting excitedly. The images or video featured in the "field at same time" section 615 may be saved with a "save" button 655, printed with a "print" button 660, or a print may be purchased via a "buy a print" button 665.

A "view album" button 625 may then be provided in order to give the user the ability to view the entire multimedia album associated with the user. The multimedia album associated with the user may be stored at the event venue system 160 (e.g., at the photo database 178 and/or the user database 180) and/or at the user device 140, and may include photos in which the user's face was identified and/or may include videos in which the user's face was identified in one or more frames of the video.

A "photo ops" button 630 may transfer the user to a photo opportunities GUI 635. The photo opportunities GUI 635 may then identify other images, videos, or video frames from various scheduled photos or videos taken by eventgoer cameras 120, as identified in the GUI 320 of the eventgoer photo app 144, for example. The photo opportunities GUI 635 may identify a camera (e.g., "Balcony Cam 2") of the eventgoer cameras 120, and may include a "is this you?" interface 640 with a "yes" or "no" option similar to the "'Face Finder' Tagged You" section 610. The photo opportunities GUI 635 may then include options to buy, save or print (or buy a print) via a sales interface 670.

The payment system 176 described in relation to FIG. 1 may be tied to the "save" button 655, the "print" button 660, the "buy a print" button 665, the "Yes, Add to Album" button 645, the buy/save/print sales interface 670, or some combination thereof.

The "'Face Finder' Tagged You" section 610, the "field at same time" section 615, and the photo opportunities GUI 635 may each also include "previous" and "next" buttons, or timeline interfaces, or album interfaces, or carousel-style interfaces, or scrolling interfaces, or touch/swipe interfaces, each of which can be used to cycle from one image/video to the next. In situations where videos are presented, video controls, such as pause, play, fast-forward, rewind, skip, and volume may also be presented as part of these interfaces.

Figure 7:
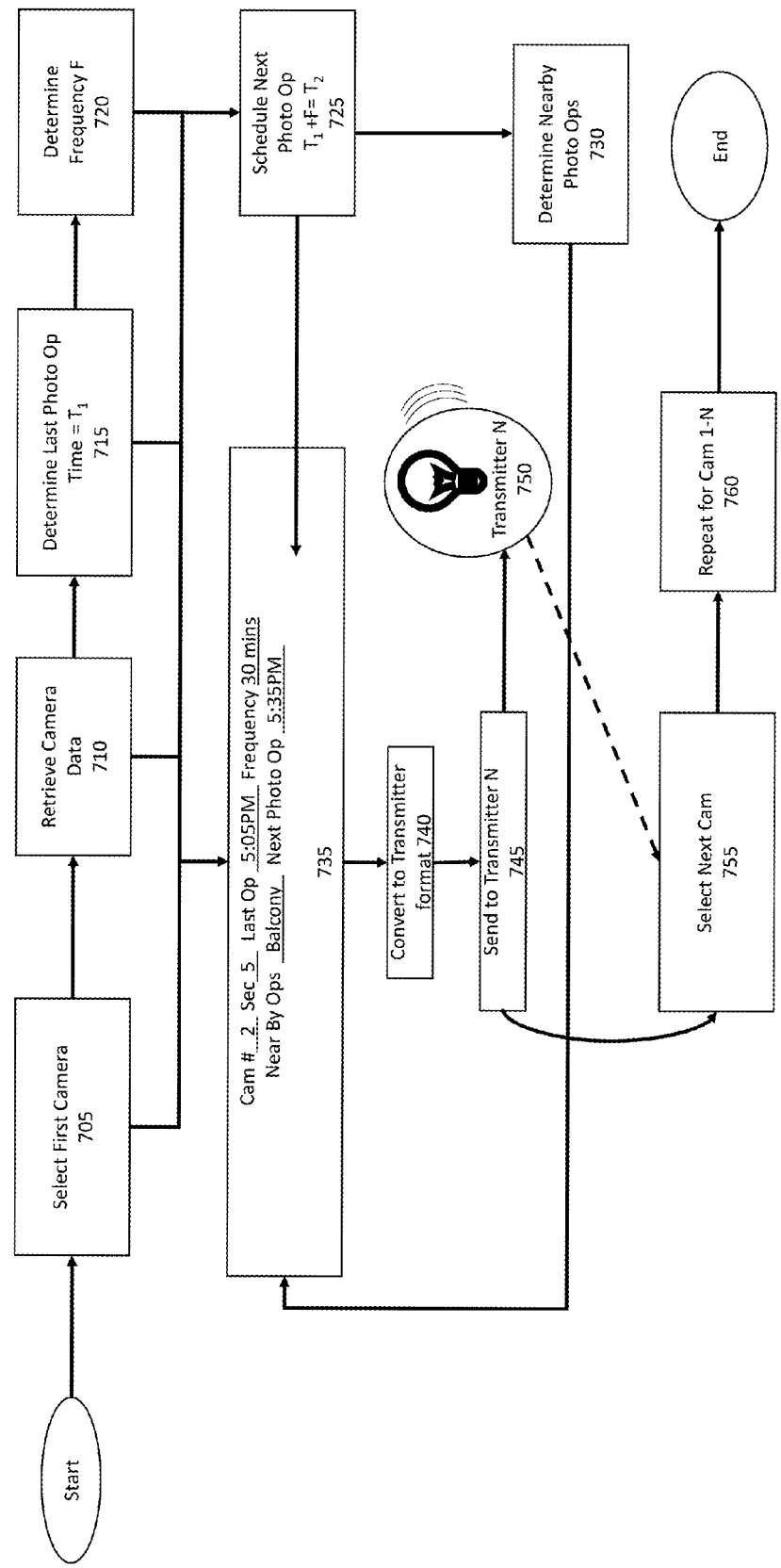
FIG. 7 is a flow diagram illustrating exemplary operations of a photo trigger software.

FIG. 7 is a flow diagram illustrating exemplary operations of a photo trigger software.

At step 705, a first camera is selected of the eventgoer cameras 120. At step 710, camera data is retrieved for the first camera, the camera data including for example, a location of the first camera, a camera viewing area of the camera, a direction or heading or angle that the camera is facing, an alphanumeric identifier of the camera, history data regarding previous photos and/or videos taken by the camera (e.g., optionally along with when the photos/videos were taken, what triggered the capture of the photos/videos, and an identification of any faces found in the photos/videos by the eventgoer face finder software 172).

At step 715, a most recent photo opportunity time (identified as $T_1$) of the first camera may be determined. At step 720, a frequency (identified as F) is determined based on historical use, desired number of photos, or some combination thereof. At step 725, a next photo opportunity time (identified as $T_2$) may be calculated and/or scheduled for the first camera based on the sum of the most recent photo opportunity time (identified as $T_1$) with the frequency (identified as F). At step 730, other nearby photo opportunities using the first camera (e.g., after moving or refocusing it) or using different cameras of the eventgoer cameras 120 may be determined.

Any of steps 705, 710, 720, 725, or 730 may lead to step 735.

At step 735, an exemplary first camera is identified along with some identifier data (e.g., Camera #2), camera location data (e.g., Section 5), photography location data (e.g., nearby photo opportunities: balcony), last photo opportunity time $T_1$ (e.g., 5:05 P.M.), a photo frequency F (e.g., every 30 minutes), and the calculated next photo opportunity time $T_2$ (e.g., 5:35 P.M.).

At step 740, the camera feed data from the first camera may be converted into a format that may be transmitted by a transmitter N 750, which may be one of a set of one or more transmitters 122. The camera feed data may include photos, videos, video frames, as well as camera data as described in step 710 through step 730 (e.g., which may be marked up in the photos/videos, stored as metadata, or some combination thereof). In some cases, no conversion is needed, as the camera feed data may already be in a format that may be transmitted by the transmitter N 750, in which case step 745 may follow from step 735. At step 745, the camera feed data converted in step 740 may be sent to transmitter N 750, where it is then transmitted. One or more user devices 140 may thereafter receive the transmitted camera feed data.

At step 755, which may follow after transmission of the camera feed data of the first camera via the transmitter N 750 in step 745, a next camera is selected from the set of eventgoer cameras 120 (or, in some cases, performance cameras 118). The steps between 705 and 755 may then be repeated over the entire set of eventgoer cameras 120 and/or performance cameras 118.

Figure 8:
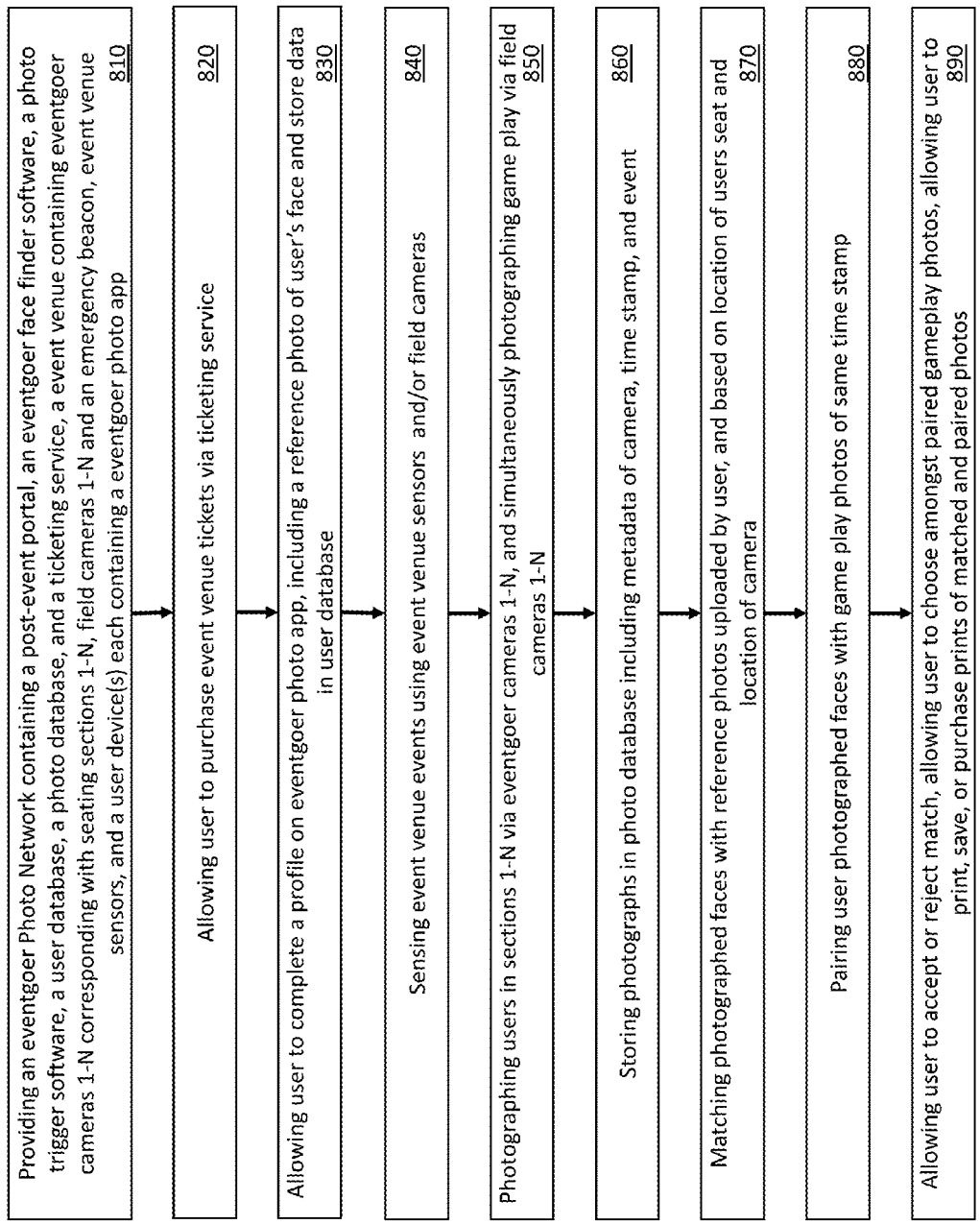
FIG. 8 illustrates an exemplary overall method of the present invention as described herein.

FIG. 8 illustrates an exemplary overall method of the present invention as described herein.

At step 810, the method includes providing an eventgoer photo network 162 containing a post-event portal 166, an eventgoer face finder software 172, a photo trigger software 174, a user database 180, a photo database 178; and a ticketing service 130, an event venue 100 containing eventgoer cameras 1-N 120 corresponding with seating sections 1-N (e.g., sections 104-114), performance cameras 1-N 118 and an emergency beacon (e.g., a fire alarm or police signal or paramedic signal), stadium sensors 102, and a user device(s) 140 each containing a eventgoer photo app 144.

At step 820, the method includes allowing a user to purchase event venue tickets via ticketing service 130.

At step 830, the method includes allowing a user to complete a profile using eventgoer photo software application 144, including a reference photo of user's face (e.g., see facial recognition reference photo 230) and store data in user database 180.

At step 840, the method includes sensing event venue events using event venue sensors 102 and/or performance cameras 118.

At step 850, the method includes photographing users in sections 1-N via eventgoer cameras 1-N 120, and simultaneously photographing game play via performance cameras 1-N 118.

At step 860, the method includes storing photographs in photo database 178 including metadata of camera, time stamp, and event data.

At step 870, the method includes matching photographed faces with reference photos uploaded by user, and based on location of a user's seat and a location of the eventgoer camera(s) 120.

At step 880, the method includes pairing user photographed faces with game play photos with substantially the same or similar time stamp.

At step 890, the method includes allowing user to accept or reject match, allowing user to choose amongst paired gameplay photos, allowing user to print, save, or purchase prints of matched and paired photos.

Figure 9:
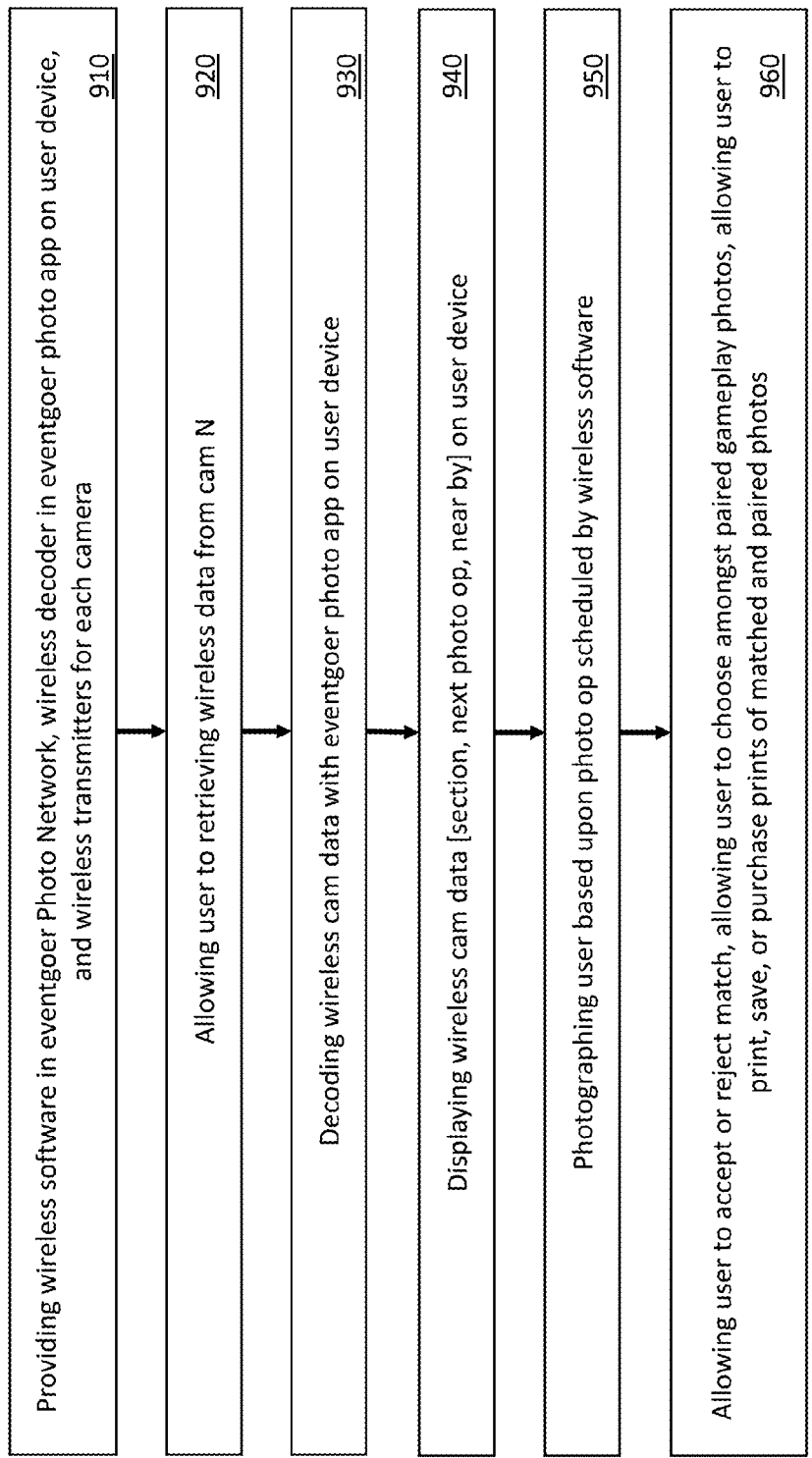
FIG. 9 illustrates an exemplary overall method of the present invention as described herein.

FIG. 9 illustrates an exemplary overall method of the present invention as described herein.

At step 910, the method includes providing wireless software 170 in eventgoer photo network, wireless decoder 146 in eventgoer photo app on user device, and wireless transmitters 122 for each eventgoer camera of the eventgoer cameras 120 and/or for each performance camera of the performance cameras 118 (optionally one or more transmitters 122 may be associated with more than one camera).

At step 920, the method includes allowing user to retrieving wireless data from a crown camera N of the eventgoer cameras 120 or a performance camera N of the performance cameras 118.

At step 930, the method includes decoding wireless camera feed data with wireless decoder 146 of the eventgoer photo app 144 on user device 140.

At step 940, the method includes displaying wireless camera feed data (e.g., including section, next photo op, nearby cameras) on user device 140.

At step 950, the method includes photographing a user based upon photo opportunities scheduled by the wireless software 170.

At step 960, the method includes allowing a user to accept or reject face matches, allowing user to choose amongst paired gameplay photos, allowing user to print, save, or purchase prints of matched and paired photos (e.g., see interfaces of FIG. 6).

Figure 10:
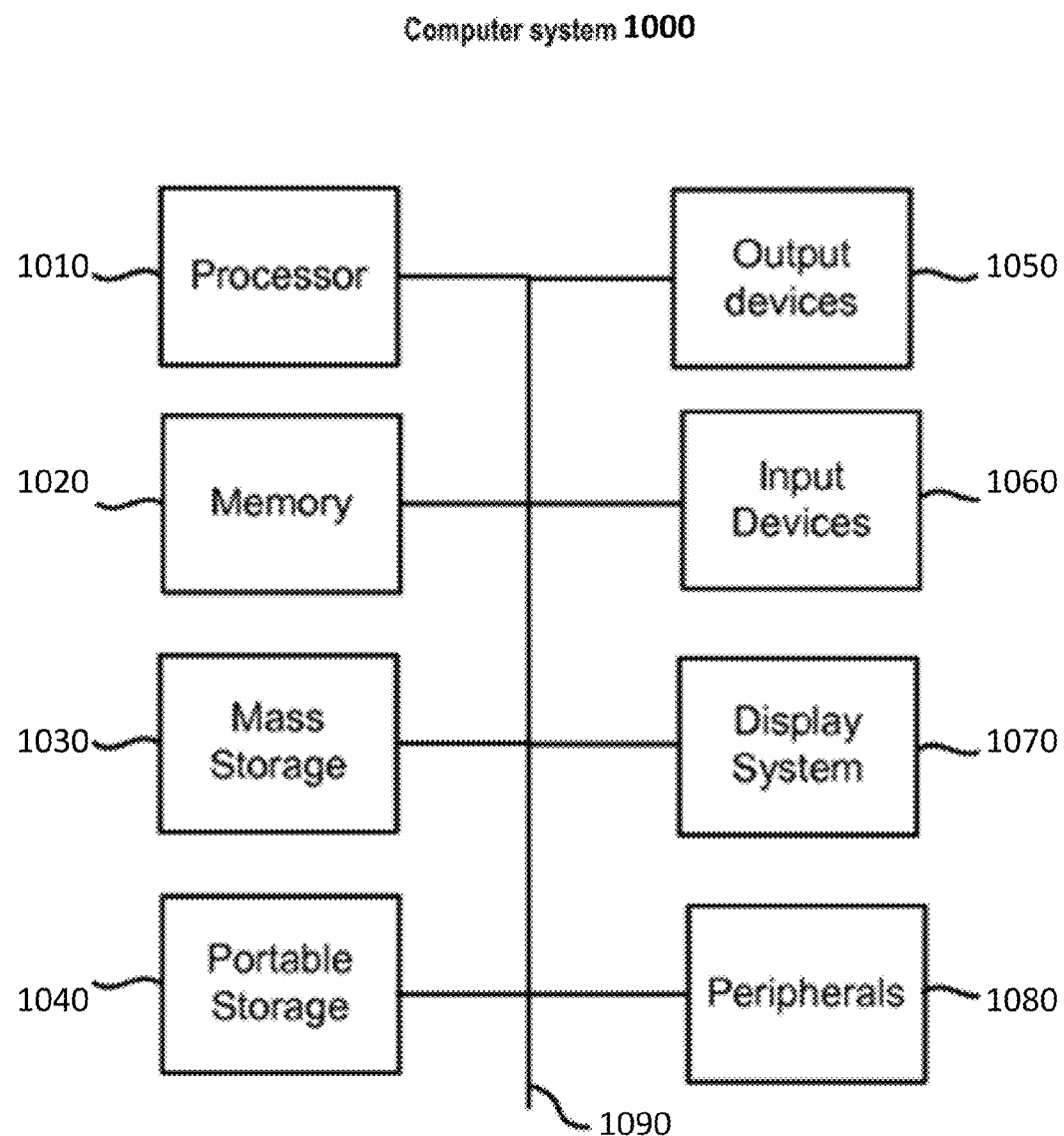
FIG. 10 is a block diagram of an exemplary computing device that may be used to implement an embodiment of the present invention.

FIG. 10 illustrates an exemplary computing system 1000 that may be used to implement an embodiment of the present invention. The computing system 1000 of FIG. 10 includes one or more processors 1010 and memory 1010. Main memory 1010 stores, in part, instructions and data for execution by processor 1010. Main memory 1010 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1010 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 1010.

Portable storage device 1040 operates in conjunction with a portable non-volatile storage medium, such as a floppy disk, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD), a plasma display, an organic light-emitting diode (OLED) display, an electronic ink display, or another suitable display device. Display system 1070 receives textual and graphical information, and processes the information for output to the display device. The display system 1070 may include touchscreen input capabilities, such as capacitive touch detection.

Peripherals 1080 may include any type of computer support device to add additional functionality to the computer system. For example, peripheral device(s) 1080 may include a modem or a router.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method for event venue camera usage, the method comprising:

storing one or more reference photographs in a memory, the one or more reference photographs depicting at least a face of an eventgoer;

receiving sensor data from a collision camera located in an event venue during a sporting event;

detecting a collision involving a predetermined visually recognizable object in a performance area of the event venue based on computerized visual collision detection using the received sensor data, wherein the collision corresponds to a gameplay occurrence during the sporting event;

triggering capture of a performance visual media of the collision in the performance area of the event venue during the sporting event using a performance camera whose view includes at least a portion of the performance area;

triggering capture of an eventgoer visual media of an eventgoer area of the event venue using an eventgoer camera whose view includes at least a portion of the eventgoer area at a same time during the sporting event as the capture of the performance visual media of the collision, wherein the eventgoer camera is distinct from the performance camera, wherein the eventgoer area is distinct from the performance area;

recognizing that a face detected within the eventgoer visual media matches the face of the eventgoer as depicted in the stored one or more reference photographs;

sending, to a user device associated with the eventgoer, a confirmation request that includes at least a subset of the eventgoer visual media and that requests a confirmation that the face detected within the eventgoer visual media is the face of the eventgoer;

receiving, from the user device, the confirmation that the face detected within the eventgoer visual media is the face of the eventgoer; and transmitting the eventgoer visual media and the performance visual media to the user device associated with the eventgoer.

2. The method of claim 1, wherein the performance visual media includes a video frame.

3. The method of claim 1, wherein the eventgoer visual media includes a video frame.

4. The method of claim 1, wherein detecting the collision is also based on an indication that a sound is detected at a microphone, further comprising receiving the indication that the sound is detected via the microphone.

5. The method of claim 1, wherein the collision camera is the performance camera.

6. The method of claim 1, wherein detecting the collision is also based on an indication that pressure is detected at a predetermined area via a pressure sensor, further comprising receiving the indication that pressure is detected at the predetermined area via the pressure sensor.

7. The method of claim 1, wherein the eventgoer visual media includes a photograph.

8. The method of claim 1, further comprising saving the eventgoer visual media to a network storage device accessible by the user device associated with the eventgoer.

9. The method of claim 1, further comprising printing the eventgoer visual media.

10. The method of claim 1, further comprising receiving payment information from the user device associated with the eventgoer.

11. A system for event venue camera usage, the system comprising:
a memory that stores one or more reference photographs depicting at least a face of an eventgoer;
a collision camera located in an event venue during a sporting event, wherein the collision camera produces sensor data during the sporting event;
a performance camera whose view includes at least a portion of a performance area of the event venue during the sporting event;
an eventgoer camera that is distinct from the performance camera and whose view includes at least a portion of an eventgoer area of the event venue that is distinct from the performance area; and
a processor of an eventgoer photo network device, wherein execution of instructions stored in the memory by the processor causes the eventgoer photo network device to:
detect a collision involving a predetermined visually recognizable object in the performance area of the event venue based on computerized visual collision detection using the sensor data, wherein the collision corresponds to a gameplay occurrence during the sporting event,
capture a performance visual media of the collision in the performance area of the event venue during the sporting event using the performance camera,
capture, at a same time during the sporting event as the capture of the performance visual media of the collision, an eventgoer visual media of the eventgoer area of the event venue using the eventgoer camera,
recognize that a face detected within the eventgoer visual media matches the face of the eventgoer as depicted in the stored one or more reference photographs,
send, to a user device associated with the eventgoer, a confirmation request that includes at least a subset of the eventgoer visual media and that requests a confirmation that the face detected within the eventgoer visual media is the face of the eventgoer,
receive, from the user device, the confirmation that the face detected within the eventgoer visual media is the face of the eventgoer, and
transmit the eventgoer visual media and the performance visual media to the user device associated with the eventgoer.

12. The system of claim 11, wherein the performance visual media includes a video frame.

13. The system of claim 11, wherein the eventgoer visual media includes a video frame.

14. The system of claim 11, wherein detecting the collision is also based on an indication that a sound is detected at a microphone, further comprising the microphone.

15. The system of claim 11, wherein the collision camera is the performance camera.

16. The system of claim 11, wherein detecting the collision is also based on an indication that pressure is detected at a predetermined area via a pressure sensor, further comprising the pressure sensor.

17. The system of claim 11, wherein the eventgoer visual media includes a photograph.

18. The system of claim 11, further comprising a network storage device accessible by the user device associated with the eventgoer, the network storage device to receive the eventgoer visual media from the eventgoer photo network in response to receipt of a payment from the user device to the eventgoer photo network.

19. The system of claim 11, further comprising a printer to print the eventgoer visual media in response to receipt of payment information from the user device to the eventgoer photo network.

20. A non-transitory computer-readable storage medium, having embodied thereon a program executable by a processor to perform a method for event venue camera usage, the method comprising:
storing one or more reference photographs in a memory, the one or more reference photographs depicting at least a face of an eventgoer;
receiving sensor data from a collision camera located in an event venue during a sporting event;
detecting a collision involving a predetermined visually recognizable object in a performance area of the event venue based on computerized visual collision detection using the received sensor data, wherein the collision corresponds to a gameplay occurrence during the sporting event;
triggering capture of a performance visual media of the collision in the performance area of the event venue during the sporting event using a performance camera whose view includes at least a portion of the performance area;
triggering capture of an eventgoer visual media of an eventgoer area of the event venue using an eventgoer camera whose view includes at least a portion of the eventgoer area at a same time during the sporting event as the capture of the performance visual media of the collision, wherein the eventgoer camera is distinct from the performance camera, wherein the eventgoer area is distinct from the performance area;

recognizing that a face detected within the eventgoer visual media matches the face of the eventgoer depicted in the stored one or more reference photographs;

sending, to a user device associated with the eventgoer, a confirmation request that includes at least a subset of the eventgoer visual media and that requests a confirmation that the face detected within the eventgoer visual media is the face of the eventgoer;

receiving, from the user device, the confirmation that the face detected within the eventgoer visual media is the face of the eventgoer; and transmitting the eventgoer visual media and the performance visual media to the user device associated with the eventgoer.

\* \* \* \* \*